(12) United States Patent
Watson et al.

(10) Patent No.: US 11,150,200 B1
(45) Date of Patent: Oct. 19, 2021

(54) WORKPIECE INSPECTION AND DEFECT DETECTION SYSTEM INDICATING NUMBER OF DEFECT IMAGES FOR TRAINING

(71) Applicant: Mitutoyo Corporation, Kanagawa-ken (JP)

(72) Inventors: William Todd Watson, Kirkland, WA (US); Shannon Roy Campbell, Woodinville, WA (US); Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 16/902,182

(22) Filed: Jun. 15, 2020

(51) Int. Cl.
*H04N 17/00* (2006.01)
*G01N 21/956* (2006.01)
(Continued)

(52) U.S. Cl.
CPC ....... *G01N 21/956* (2013.01); *G01N 21/8806* (2013.01); *G06T 7/0004* (2013.01); *G06T 2207/30108* (2013.01)

(58) Field of Classification Search
CPC . G06T 2207/30164; G06T 2207/10056; G06T 2207/10016; G06T 2207/30108; G06T 7/0004; G06T 7/13; G01N 21/88; G01N 21/00; H04N 5/23212; H04N 5/2353; H04N 5/23216; G04N 5/2256; G02B 21/367; G02B 21/0016
(Continued)

(56) References Cited

U.S. PATENT DOCUMENTS 5,982,920 A   11/1999   Tobin, Jr. et al.
6,718,526 B1   4/2004   Eldredge et al.
(Continued)

FOREIGN PATENT DOCUMENTS

WO   2019/133234 A1   7/2019

OTHER PUBLICATIONS

Mitutoyo Corporation & Micro Encoder Inc. "QVPAK® 3D CNC Vision Measuring Machine," User's Guide, Version 7, 2003, 329 pages.
(Continued)

*Primary Examiner* — Hoa Q Pham
(74) *Attorney, Agent, or Firm* — Seed IP Law Group LLP

(57) ABSTRACT

A workpiece inspection and defect detection system includes a light source, a lens that inputs image light arising from a surface of a workpiece, and a camera that receives imaging light transmitted along an imaging optical path. The system utilizes images of workpieces acquired with the camera as training images to train a defect detection portion to detect defect images that include workpieces with defects, and determines a performance of the defect detection portion as trained with the training images. Based on the performance of the defect detection portion, an indication is provided as to whether additional defect images should be provided for training. After training is complete, the camera is utilized to acquire new images of workpieces which are analyzed to determine defect images that include workpieces with defects, and for which additional operations may be performed (e.g., metrology operations for measuring dimensions of the defects, etc.)

24 Claims, 20 Drawing Sheets

(51) Int. Cl.
*G01N 21/88* (2006.01)
*G06T 7/00* (2017.01)

(58) Field of Classification Search
USPC ................................ 382/141, 152, 145, 219; 356/237.1–237.5
See application file for complete search history.

(56) References Cited

U.S. PATENT DOCUMENTS

| | | | |
|---|---|---|---|
| 6,885,977 B2 | 4/2005 | Gavra et al. | |
| 7,030,351 B2 | 4/2006 | Wasserman et al. | |
| 7,324,682 B2 | 1/2008 | Wasserman | |
| 7,359,544 B2 | 4/2008 | Gao et al. | |
| 7,454,053 B2 | 11/2008 | Bryll et al. | |
| 7,522,763 B2 | 4/2009 | Tessadro | |
| 7,570,795 B2 | 8/2009 | Yu et al. | |
| 7,602,962 B2 | 10/2009 | Miyamoto et al. | |
| 7,627,162 B2 | 12/2009 | Blanford et al. | |
| 7,676,077 B2 | 3/2010 | Kulkarni et al. | |
| 8,111,905 B2 | 2/2012 | Campbell | |
| 8,111,938 B2 | 2/2012 | Bryll et al. | |
| 8,135,204 B1 | 3/2012 | Chen et al. | |
| 8,165,837 B1 | 4/2012 | Paramasivam et al. | |
| 8,254,661 B2 | 8/2012 | Auerbach | |
| 8,255,172 B2 | 8/2012 | Auerbach | |
| 8,315,453 B2 | 11/2012 | Shlain et al. | |
| 8,437,534 B2 | 5/2013 | Shibuya et al. | |
| 8,452,076 B2 | 5/2013 | Nakagaki et al. | |
| 8,553,970 B2 | 10/2013 | Auerbach | |
| 9,013,574 B2 | 4/2015 | Saylor et al. | |
| 9,143,674 B2 | 9/2015 | Gladnick | |
| 9,167,215 B2 | 10/2015 | Delaney et al. | |
| 9,430,743 B2 | 8/2016 | Plihal | |
| 9,430,824 B2 | 8/2016 | Sezginer et al. | |
| 9,607,233 B2 | 3/2017 | Kaizerman et al. | |
| 9,613,255 B2 | 4/2017 | Amzaleg et al. | |
| 9,613,411 B2 | 4/2017 | Konuru et al. | |
| 9,639,083 B2 | 5/2017 | Tseo et al. | |
| 9,646,425 B2 | 5/2017 | Yu et al. | |
| 9,715,723 B2 | 7/2017 | Shlain et al. | |
| 9,830,694 B2 * | 11/2017 | Bryll | G06T 7/0004 |
| 9,961,253 B2 * | 5/2018 | Bryll | H04N 5/2254 |
| 10,043,264 B2 | 8/2018 | Greenberg et al. | |
| 10,101,572 B2 * | 10/2018 | Bryll | H04N 5/23212 |
| 10,341,646 B2 * | 7/2019 | Gladnick | H04N 5/2353 |
| 10,436,720 B2 | 10/2019 | He et al. | |
| 10,482,590 B2 | 11/2019 | He et al. | |
| 10,520,301 B1 | 12/2019 | Tobiason | |
| 10,748,271 B2 | 8/2020 | Asbag et al. | |
| 2004/0156540 A1 | 8/2004 | Gao et al. | |
| 2007/0156379 A1 | 7/2007 | Kulkarni et al. | |
| 2007/0230770 A1 | 10/2007 | Kulkarni et al. | |
| 2007/0288219 A1 | 12/2007 | Zafar et al. | |
| 2009/0080759 A1 | 3/2009 | Bhaskar et al. | |
| 2013/0279795 A1 | 10/2013 | Shlain et al. | |
| 2015/0254832 A1 | 9/2015 | Plihal | |
| 2016/0189055 A1 | 6/2016 | Zvitia | |
| 2016/0299493 A1 | 10/2016 | Yu et al. | |
| 2018/0130199 A1 | 5/2018 | Brauer et al. | |
| 2018/0197714 A1 | 7/2018 | Plihal et al. | |
| 2018/0204315 A1 | 7/2018 | Plihal et al. | |
| 2019/0067060 A1 | 2/2019 | Plihal et al. | |
| 2019/0073566 A1 | 3/2019 | Brauer | |
| 2019/0147283 A1 | 5/2019 | Giering et al. | |
| 2020/0234428 A1 * | 7/2020 | George | G06K 9/6257 |
| 2021/0063897 A1 * | 3/2021 | Gladnick | G03F 7/70041 |
| 2021/0191228 A1 * | 6/2021 | Gladnick | G02F 1/33 |

OTHER PUBLICATIONS

Zeiler et al., "Visualizing and Understanding Convolutional Networks," arXiv:1311.2901v3, Nov. 28, 2013, 11 pages.

* cited by examiner

WORKPIECE INSPECTION AND DEFECT DETECTION SYSTEM INDICATING NUMBER OF DEFECT IMAGES FOR TRAINING

FIELD

This disclosure relates to workpiece inspection systems, and more particularly to precision machine vision systems for inspecting workpieces and detecting defects.

BACKGROUND

Precision non-contact workpiece inspection systems such as machine vision inspection systems (or "vision systems" for short) may be utilized to obtain images of workpieces for inspection. Such systems may be utilized for various types of applications (e.g., general workpiece inspection, metrology applications for determining precise dimensional measurements of workpieces, etc.) Such systems generally include a computer, a camera and optical system. In certain configurations, a movement mechanism (e.g., a precision stage, a conveyor, etc.) may be included that moves to allow workpiece traversal and inspection. One exemplary prior art machine vision inspection system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of workpieces.

Such machine vision inspection systems have typically faced various types of challenges for inspecting workpieces (e.g., due to variations in the types or surfaces of the workpieces being inspected, changing inspection conditions, etc.) A system that can provide improvements with respect to such issues for certain types of inspection operations (e.g., for workpiece defect detection and/or improved accuracy for detecting defects) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A workpiece inspection and defect detection system is provided including a light source, a lens, a camera, one or more processors, and a memory. The lens inputs image light arising from a surface of a workpiece which is illuminated by the light source, and transmits the image light along an imaging optical path. The camera receives imaging light transmitted along the imaging optical path and provides an image of the workpiece.

The memory is coupled to the one or more processors and stores program instructions that when executed by the one or more processors cause the one or more processors to at least: utilize images of workpieces acquired with the camera as training images to train a defect detection portion to detect defect images that include a workpiece with a defect, wherein the training images include both defect images and non-defect images; determine an accuracy performance of the defect detection portion as trained with the training images; based at least in part on the accuracy performance of the defect detection portion as trained with the training images, provide an indication as to whether additional defect images should be provided to be used as training images for training the defect detection portion; and after no additional images are to be used as training images to train the defect detection portion, utilize the camera to acquire a plurality of new images of workpieces during a run mode and utilize the defect detection portion to analyze the new images to determine defect images that include workpieces with defects.

In various implementations, the indication that is provided comprises a message that indicates that additional defect images should be provided, and the defect detection portion is trained with additional defect images that are correspondingly provided. The accuracy performance of the defect detection portion as trained with the additional defect images is determined, and based at least in part on the accuracy performance of the defect detection portion as trained with the additional defect images, an indication is provided as to whether additional defect images should be provided to be used as training images for training the defect detection portion. In various implementations, the performance of the defect detection portion as trained with the additional defect images may correspond to a portion of an accuracy performance curve that has a lower slope than a portion of the performance curve that corresponds to the performance of the defect detection portion before the additional defect images were used to train the defect detection portion. Also, when no additional images are to be used to train the defect detection portion, the slope of the portion of the accuracy performance curve that corresponds to the performance of the defect detection portion as trained by the current number of defect images may be approximately flat relative to earlier portions of the performance curve.

In various implementations, the determination of the accuracy performance of the defect detection portion may be based at least in part on a determination of a number of defect pixels or defect images that are accurately classified by the defect detection portion as defect pixels or defect images. In various implementations, the determination of the accuracy performance of the defect detection portion may also or alternatively be based at least in part on a determination of a number of non-defect pixels or non-defect images that are accurately classified by the defect detection portion as non-defect pixels or non-defect images.

In various implementations, one or more metrology operations using one or more of the new images of workpieces acquired during the run mode may be performed (e.g., for measuring dimensions of defects on the workpieces, etc.)

In various implementations, the training images may comprise a first plurality of training images and a second plurality of training images, and the determining of the accuracy performance of the defect detection portion may comprise: utilizing a first plurality of testing or validation images of workpieces acquired with the camera, and that are not included in the first plurality of training images, to test the defect detection portion as trained using the first plurality of training images, wherein a first accuracy performance metric is determined from the test; utilizing a second plurality of testing or validation images acquired with the camera, and that are not included in the first or second plurality of training images, to test the defect detection portion as trained using the first and second plurality of training images, wherein a second accuracy performance metric is determined from the test; and based at least in part on the first and second performance metrics, determining a recommended number of defect images for training the defect detection portion. In various implementations, the providing of the indication may comprise generating a message that includes the recommended number of defect images for training, and for which the recommended number of defect images correspondingly indicates whether additional defect images should be provided in relation to a current number of defect images that have been utilized for the training.

In various implementations, augmented data may be utilized to train the defect detection portion (e.g., in addition to the other training images). Based at least in part on an accuracy performance of the defect detection portion as trained with and without the augmented data, a determination may be made of at least one of: whether additional defect images should be provided to be used as training images for training the defect detection portion; or a recommended number of defect images for training the defect detection portion (e.g., for which the recommended number of defect images may correspondingly indicate whether additional defect images should be provided in relation to a current number of defect images that have been utilized for the training).

In various implementations a method (e.g., a computer-implemented method operated under control of one or more computing systems configured with executable instructions) may be provided as performed by a workpiece inspection and defect detection system including at least a light source, a lens, a camera and a defect detection portion, the method comprising: utilizing images of workpieces acquired with the camera as training images to train a defect detection portion to detect defect images that include a workpiece with a defect, wherein the training images include both defect images and non-defect images; determining an accuracy performance of the defect detection portion as trained with the training images; based at least in part on the accuracy performance of the defect detection portion as trained with the training images, providing an indication as to whether additional defect images should be provided to be used as training images for training the defect detection portion; and after no additional images are to be used as training images to train the defect detection portion, utilizing the camera to acquire a plurality of new images of workpieces during a run mode and utilizing the defect detection portion to analyze the new images to determine defect images that include workpieces with defects.

In various implementations, a non-transitory computer-readable medium may be provided which stores program instructions that when executed by one or more processors cause the one or more processors to at least: utilize images of workpieces acquired with a camera of a workpiece inspection and defect detection system as training images to train a defect detection portion to detect defect images that include a workpiece with a defect, wherein the training images include both defect images and non-defect images; determine an accuracy performance of the defect detection portion as trained with the training images; based at least in part on the accuracy performance of the defect detection portion as trained with the training images, provide an indication as to whether additional defect images should be provided to be used as training images for training the defect detection portion; and after no additional images are to be used as training images to train the defect detection portion, utilize the camera to acquire a plurality of new images of workpieces during a run mode and utilize the defect detection portion to analyze the new images to determine defect images that include workpieces with defects.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
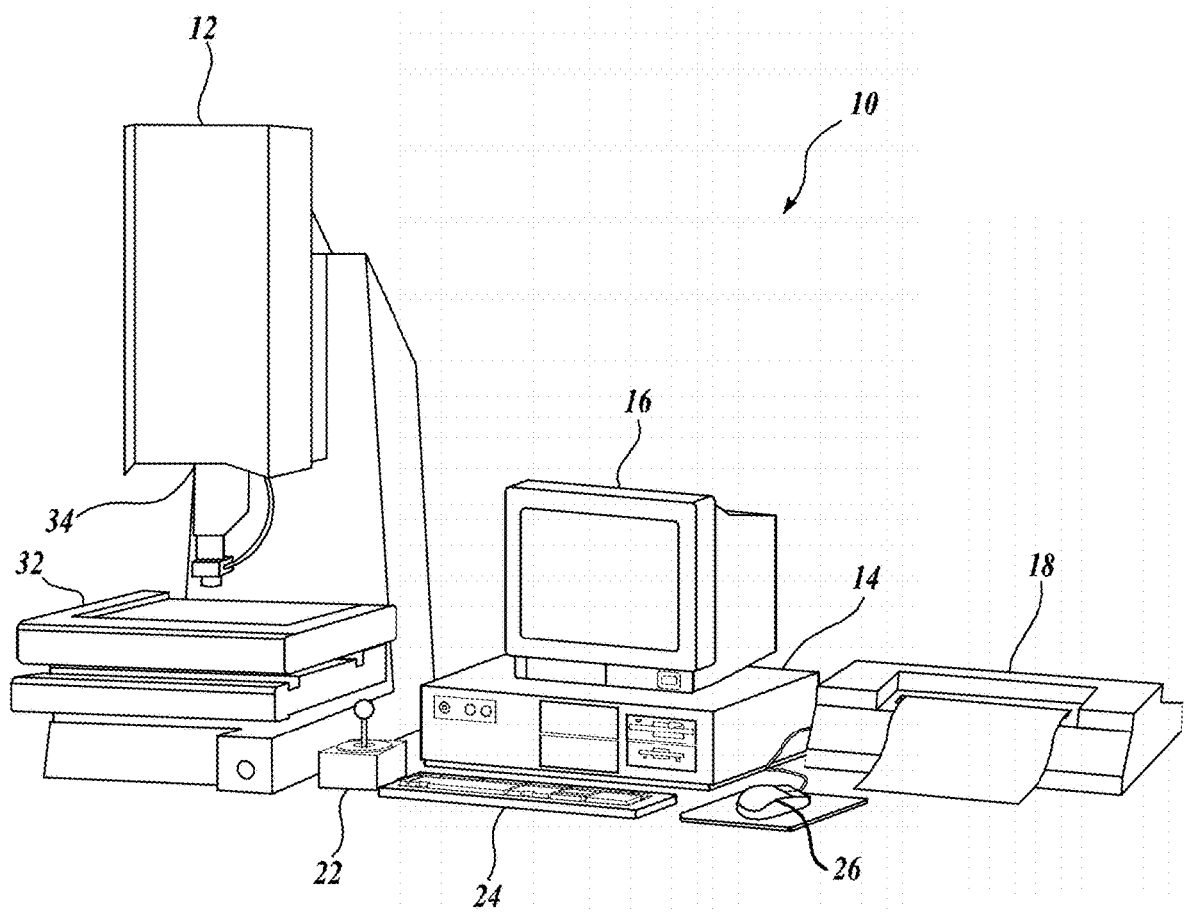
FIG. 1 is a diagram showing various typical components of a general-purpose precision machine vision inspection system.

FIG. 1 is a block diagram of one exemplary machine vision inspection system 10 usable as an imaging system in accordance with methods described herein. The machine vision inspection system 10 includes a vision inspection machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various exemplary implementations, a touchscreen tablet and/or similar devices or the like may be substituted for and/or redundantly provide the functions of any or all of the elements 14, 16, 22, 24 and 26.

Those skilled in the art will appreciate that the controlling computer system 14 and/or other control systems described herein may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision inspection machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various exemplary implementations of the machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
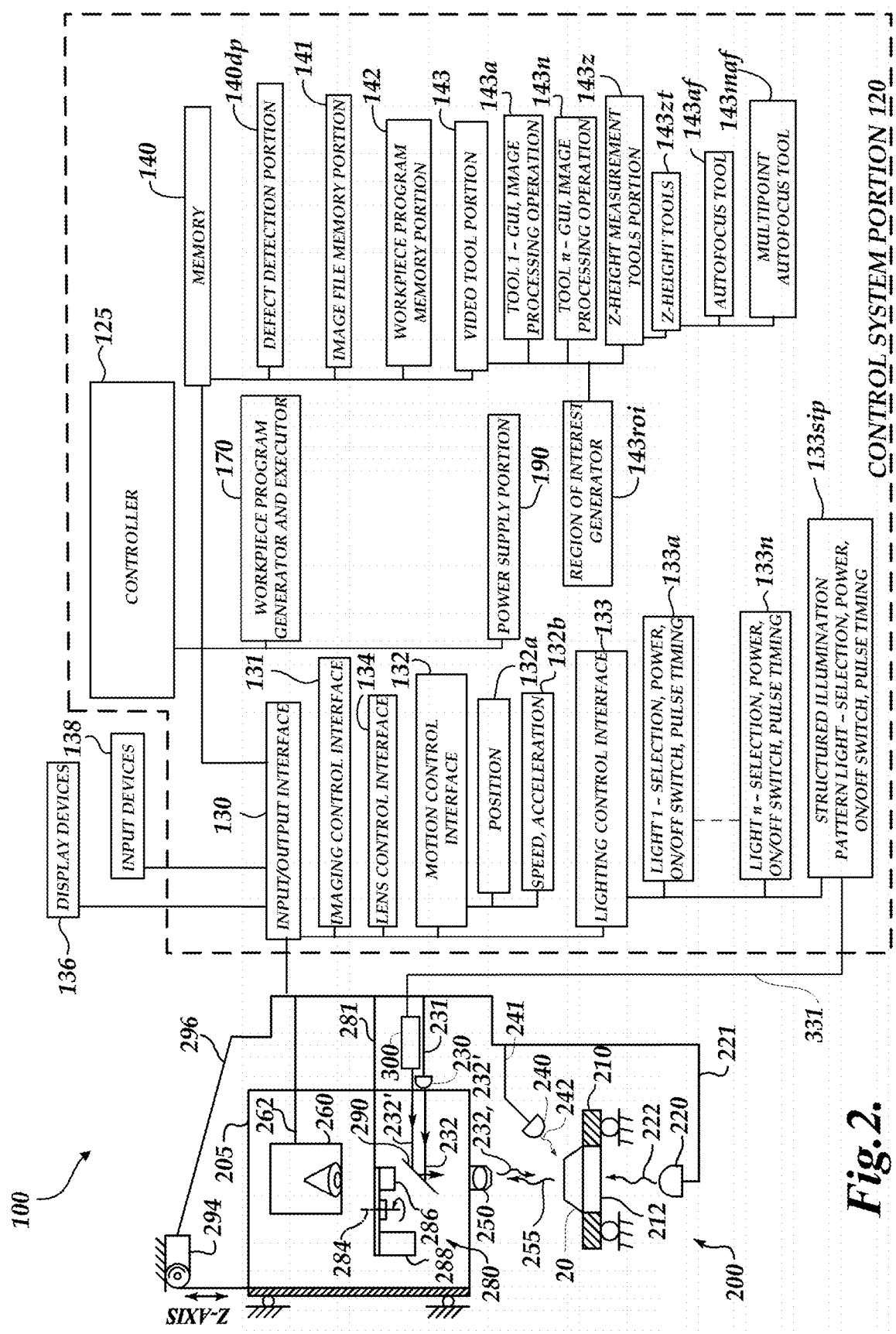
FIG. 2 is a block diagram of a control system portion and a vision components portion of a machine vision inspection system similar to that of FIG. 1 and including certain features disclosed herein.
Figure 3A:
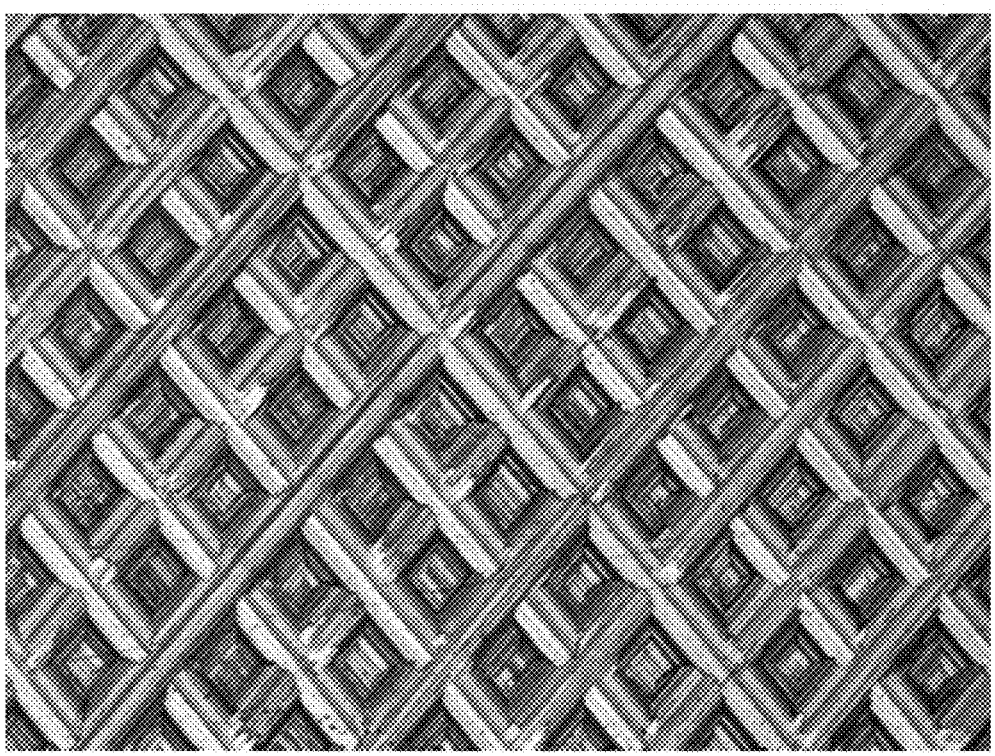
FIGS. 3A-3F are examples of images of portions of workpieces that do not include defects, as may be acquired using a machine vision inspection system similar to that of FIG. 1.
Figure 3B:
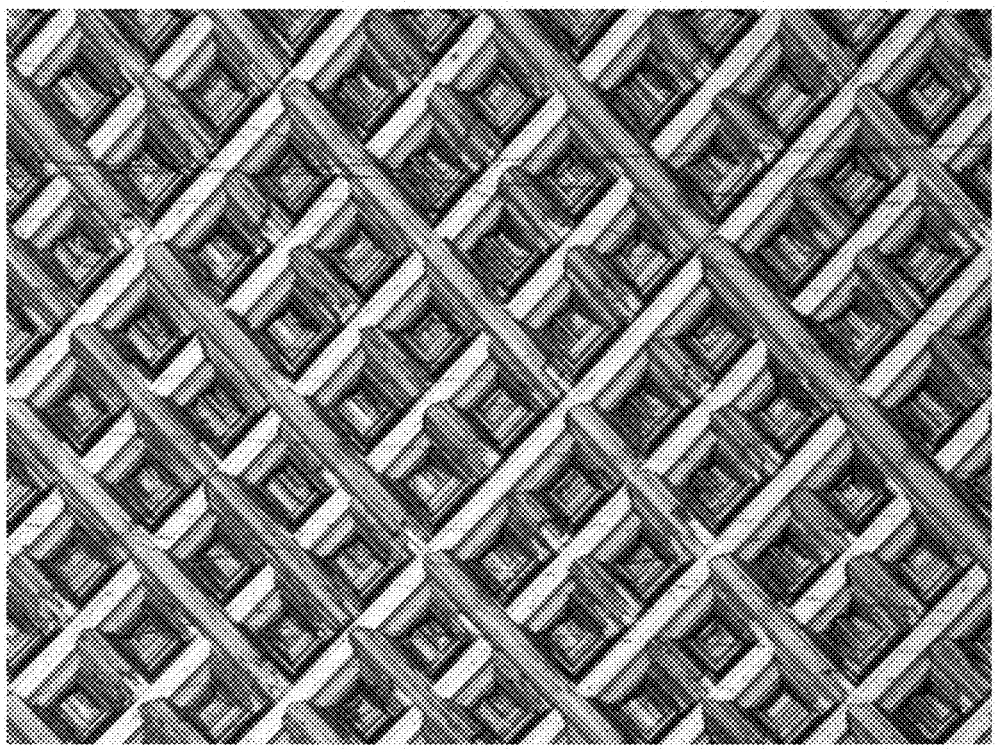
Figure 3C:
Figure 3D:
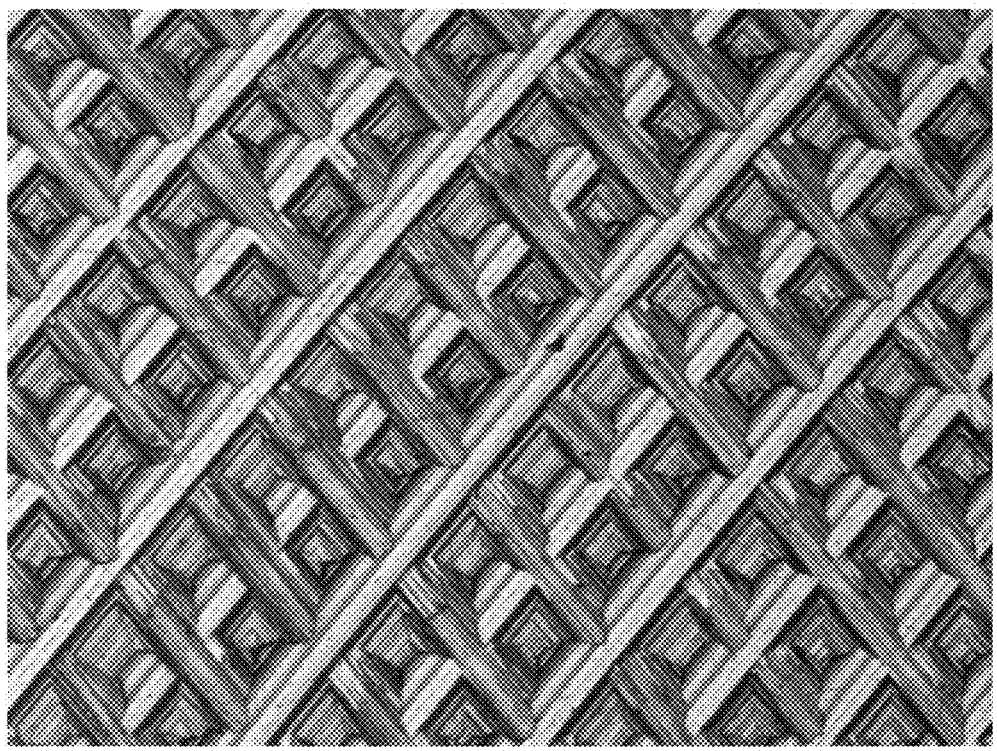
Figure 3E:
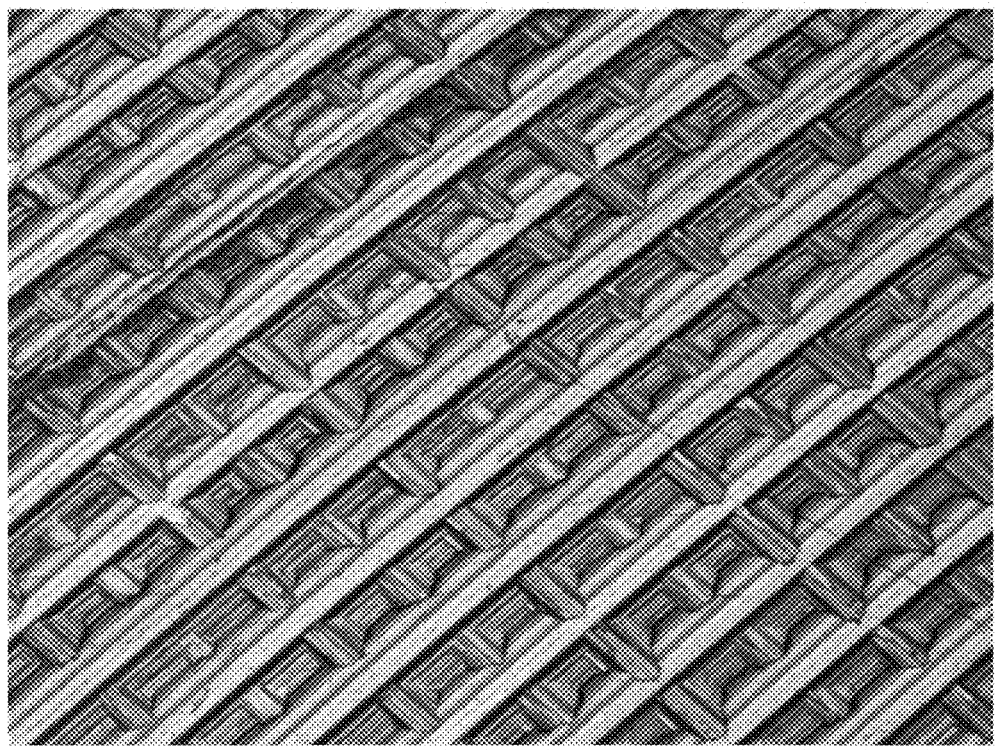
Figure 3F:
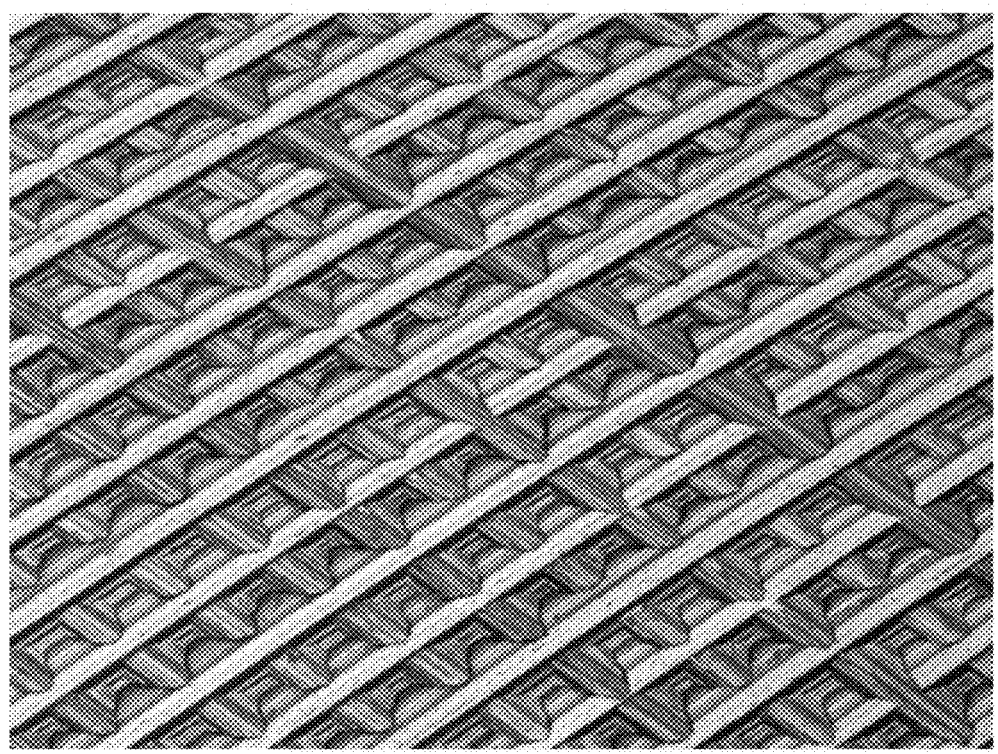

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The control system portion 120 may be arranged to exchange data and control signals with the vision components portion 200. The vision components portion 200 includes an optical assembly portion 205, light sources 220, 230, 240, 300, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260 and an interchangeable objective lens 250. In some implementations, the optical assembly portion 205 may optionally include a variable focal length (VFL) lens, e.g., a tunable acoustic gradient (TAG) such as that disclosed in U.S. Pat. No. 9,143,674, which is hereby incorporated herein by reference in its entirety.

In various exemplary implementations, the optical assembly portion 205 may further include a turret lens assembly 223 having lenses 226 and 228. As an alternative to the turret lens assembly, in various exemplary implementations a fixed or manually interchangeable magnification-altering lens, or a zoom lens configuration, or the like, may be included. In various exemplary implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296, to change the focus of the image over a certain range. A workpiece 20 may be placed on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted as workpiece light 255, and the workpiece light used for imaging passes through the interchangeable objective lens 250 and the turret lens assembly 223 and is gathered by the camera system 260. A workpiece image exposure which includes the image of the workpiece(s) 20, is captured by the camera system 260, and is output on a signal line 262 to the control system portion 120.

Various light sources (e.g., the light sources 220, 230, 240, 300) may be connected to a lighting control interface 133 of the control system portion 120 through associated signal lines (e.g., the busses 221, 231, 241, 331, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134.

The lighting control interface 133 may include lighting control elements 133a-133n, that control, for example, the selection, power, and on/off switch for the various corresponding light sources of the machine vision inspection system 100. The lighting control interface 133 also includes a lighting control element 133sip that, in the illustrated embodiment, may work in conjunction with a structured illumination pattern (SIP) generating portion 300 to provide structured illumination during image acquisitions. In various implementations, a projected pattern may be output from the SIP generating portion 300 to be input to the beamsplitter 290, where it is directed as coaxial light through the objective lens 250 to provide SIP structured light 232' to illuminate the field of view.

The memory 140 may include an image file memory portion 141, a defect detection portion 140dp, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various exemplary implementations, the autofocus video tool 143af may additionally include a high-speed focus height tool that may be utilized to measure focus heights with high speed using hardware, as described in more detail in U.S. Pat. No. 9,143,674, which is hereby incorporated herein by reference in its entirety. In various exemplary implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, which are hereby incorporated herein by reference in their entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In various exemplary implementations, certain types of training modes may also or alternatively be utilized (e.g., a training mode for training a defect detection portion for detecting defects, a training mode for training an anomaly detector portion to detect anomalous images that are not acceptable for defect detection processes, etc.)

The video tool portion 143 also includes Z-height measurement tools portion 143z, which provides various operations and features related to Z-height measurement operations. In one implementation, the Z-height measurement tools portion 143z may include Z-height tools 143zt. The Z-height tools 143zt may include an autofocus tool 143af, and a multipoint autofocus tool 143maf, for example. The Z-height tools 143zt may govern certain aspects of image stack acquisition and related structured light pattern generation operations in conjunction with the Z-height tools that are configured in a mode that determines best focus heights and/or Z-height measurements. In general, the Z-height measurement tools portion 143z may perform at least some operations similarly to known Z-height measurement tools, for example, performing operations in a learn mode and/or run mode or other mode, for generating all or part of a focus curve, and finding its peak as a best focus position. For example, certain known operations for Z-height measurement tools are described in U.S. Pat. No. 10,520,301, which is hereby incorporated herein by reference in its entirety.

The defect detection portion 140dp performs various defect detection operations, as will be described in more detail below. In various implementations, the defect detection portion 140dp utilizes models that require training data. In various exemplary implementations, the models may be supervised (e.g., artificial intelligence (AI), etc.) models. The defect detection portion 140dp processes image data corresponding to user labeled images of defects to train a classification model, which in various implementations may be an AI classification model. The number of images that are required to achieve accurate model predictions on test images can vary greatly (e.g., from about 25 to 300), depending upon factors such as defect and background complexity, variation, and visual differentiation. The defect detection portion 140dp analyzes a set of defect images provided and labeled by a user, and provides the user with an indication as to whether additional defect images should be provided for the training. As an example, in various implementations the user may be provided with a recommendation (e.g., a yes or no recommendation) as to whether or not more images will improve the performance. As another example, an estimate may be provided of how many defect images are needed in order to train the classification model such that it can perform high accuracy classification. As disclosed herein, such determinations and recommendations are unique to the images provided by the user, characteristics of defects, and the particular model being used, rather than being a generic recommendation of a predetermined number of images (e.g., 100 images). Such guidance enables the user to provide a sufficient quantity of defect images to achieve a model with excellent accuracy classification ability, without taxing the user to provide additional images when little model accuracy improvement is expected from such additional images.

In various exemplary implementations, the defect detection portion 140*dp* may implement a defect detection process that is performed along with a metrology process. In various implementations, it may be desirable to include the defect detection portion 140*dp* in a machine vision inspection system similar to the machine vision inspection system 100 of FIG. 1, which is configured to perform a metrology process, because the system can generate image data that are input to the defect detection process implemented by the defect detection portion 140*dp*. Accordingly, a single machine is configured to perform both a metrology process and a defect detection process, which can provide advantages over conventional metrology systems. For example, if a defect is detected in a workpiece while the defect detection process is performed, there may be no reason to perform the metrology process on the workpiece, which can save time. More specifically, if a defect is detected in a workpiece while the defect detection process is performed, it may not be necessary to measure a clearly defective part. Thus, it may be advantageous to perform the defect detection process prior to starting the metrology process.

Also, some defects might warrant further metrology or inspection to determine additional defect parameters. For example, a 2D image could enable a likely defect to be quickly recognized and enable an XY position of the defect and an approximate XY area of the defect to be quickly ascertained. If the 3D nature of a potential defect is important, the defect detection portion 140*dp* may cause additional processing (e.g., metrology operations) to be performed to determine whether the potential defect is an actual defect. For example, if a scratch in a surface of a workpiece must be deeper than a particular threshold value to be considered a defect, the defect detection portion 140*dp* could cause a more time consuming 3D point cloud of the affected region to be acquired (e.g., utilizing a z-height measurement tools portion 143*z*), to learn if the depth of the scratch is sufficient to cause the part to be rejected. In various implementations, different actions may be performed (e.g., as may be programmed to automatically occur) as a result of an initial defect classification, such as (1) continue with a standard metrology process, (2) stop or pause the defect detection process and perform a metrology process that includes more informative measures of the potential defect (e.g., 3D, different lighting, touch probe measurements such as surface roughness, etc.), (3) send the workpiece to scrap (e.g., discard or recycle workpiece), (4) send the workpiece for additional human inspection, (5) provide feedback to a production line that indicates something may be wrong with the machinery or process, etc.

In various exemplary implementations, the defect detection portion 140*dp* of the memory 140 stores model data and program instructions for various tools and algorithms of a defect detection system that can be used to infer whether various types of defects are present in an image of a workpiece (e.g., as indicating a defect in the surface of the workpiece that is included in the image). While the machine vision inspection system is operated in a training or learning mode, the defect detection system uses a set of training images including defect and non-defect images for training the defect detection portion 140*dp*. The set of training images is captured using specific (e.g., current) imaging, lighting, and workpiece conditions. After the defect detection portion 140*dp* is initially trained, the defect detection portion 140*dp* is operated in a run mode to infer whether a defect is included in new, previously unseen workpiece images, and to correspondingly classify each workpiece image as a defect or non-defect.

More particularly, in various implementations the defect detection portion 140*dp* may utilize models (e.g., machine learning models, artificial intelligence (AI) models, etc.) that are trained to recognize defects in images, which often require many example images of defects. The number of defect training images required to obtain excellent results will vary depending upon the particular workpiece being inspected and the types of defects in the workpiece (e.g., in ways that may be difficult to describe to a user). Because the number of training images needed for good results is unknown, some defect detection software may recommend providing a predetermined number of defect images (e.g., 100), wherein additional defect images may be provided, if available. For some defects and workpiece backgrounds, a smaller number of defect images (e.g., 50) than the predetermined number of defect images (e.g., 100) may only be needed to obtain excellent results, and for which a user may be wasting valuable time by providing and marking more defect images than are needed. For other more visually difficult defects and workpiece backgrounds, a larger number of defect images (e.g., 200) than the predetermined number of defect images (e.g., 100) may be required to produce the best model performance (e.g., with few false negative detections and few false positive detections). In this case, if the user has provided a generally recommended default number of defect images (e.g., 100 defect images), the user will not know if providing additional defect images is likely to improve performance without taking time to collect and mark these images and further train the model to assess the performance. This may waste time and effort sometimes with little or no potential benefit for model performance. While providing more defect training images may in some instances produce better performance of the model, for some number of images that is unique to each image defect/background data set, the performance improvements that can be expected may be nominally negligible. Accordingly, it may be desirable to provide data set specific guidance as to when more images will no longer significantly improve performance. Thus, the defect detection portion 140*dp* is configured to automatically assess the performance of a model and provide an indication if additional defect images should be provided for the training (e.g., in relation to whether the training with the additional defect images is likely to significantly improve the performance or alternatively if any such improvements are likely to be nominally negligible).

As will be described in more detail below, FIGS. 3A-3F, 4A-4E and 5A-5D show examples of some workpiece images that may be acquired by the machine vision inspection system 100 and may in some implementations be utilized to train the defect detection portion 140*dp* (e.g., as training images and/or testing images) during a training mode (and/or some of the images may be examples of workpiece images that are later acquired by the machine vision inspection system 100 during a run mode and may be analyzed by the trained defect detection portion 140*dp*). In particular, the example workpiece images of FIGS. 3A-3F and 4A-4E are of different sections (i.e., at different XY locations) on machined aluminum plates, and for which FIGS. 3A-3F show examples of non-defect images and FIGS. 4A-4E show examples of defect images (e.g., for which a set of training images will typically include a number of both defect and non-defect workpiece images), as will be described in more detail below. The differences between the images help illustrate in part why it may be desirable to utilize a number of training images for training the defect detection portion 140dp. More specifically, due in part to different possible characteristics of different workpiece images that may be acquired for inspecting a type of workpiece (e.g., as illustrated by the differences between the workpiece images FIGS. 3A-3F and 4A-4E for inspecting a type of machined aluminum plate), the accuracy of the defect detection portion 140dp for detecting defects may be improved by utilizing a variety of workpiece images for the training that may be similar to a variety of images that may later be acquired during a run mode and/or that may otherwise better enable detection of defects in such images. For example, in specific regard to the examples of FIGS. 3A-3F, 4A-4E and 5A-5D, such training may help the defect detection portion 140dp distinguish between the defects (e.g., which in the illustrated examples may include a variety of different types of scratch defects, etc.) and the features of normal workpiece surfaces (e.g., which in the illustrated examples may include a variety of different types of machining marks formed on the plate surfaces which appear as a hashed texture that normally varies across the surface, etc.)

As noted above, FIGS. 3A-3F and 4A-4F are examples of workpiece images of sections of workpieces which are relatively "flat" machined aluminum plates. Each image is taken from a same angular view point (e.g., directly overhead at a 90 degree angle to the plate) but each at a different XY location on a plate. Each image shows a view that is about 2.5 millimeters by 1.9 millimeters (XY) of a surface of the plates. Accordingly, each image shows a magnified view of a portion of a surface of a plate. Machining marks formed on a plate surface create a hashed texture that normally varies across the surface. In the images, at such a magnified scale, the relatively flat plate may not appear to be flat. In the current example, the height of some of the hashed machining mark ridges may be approximately 5 micrometers or less.

Figure 4A:
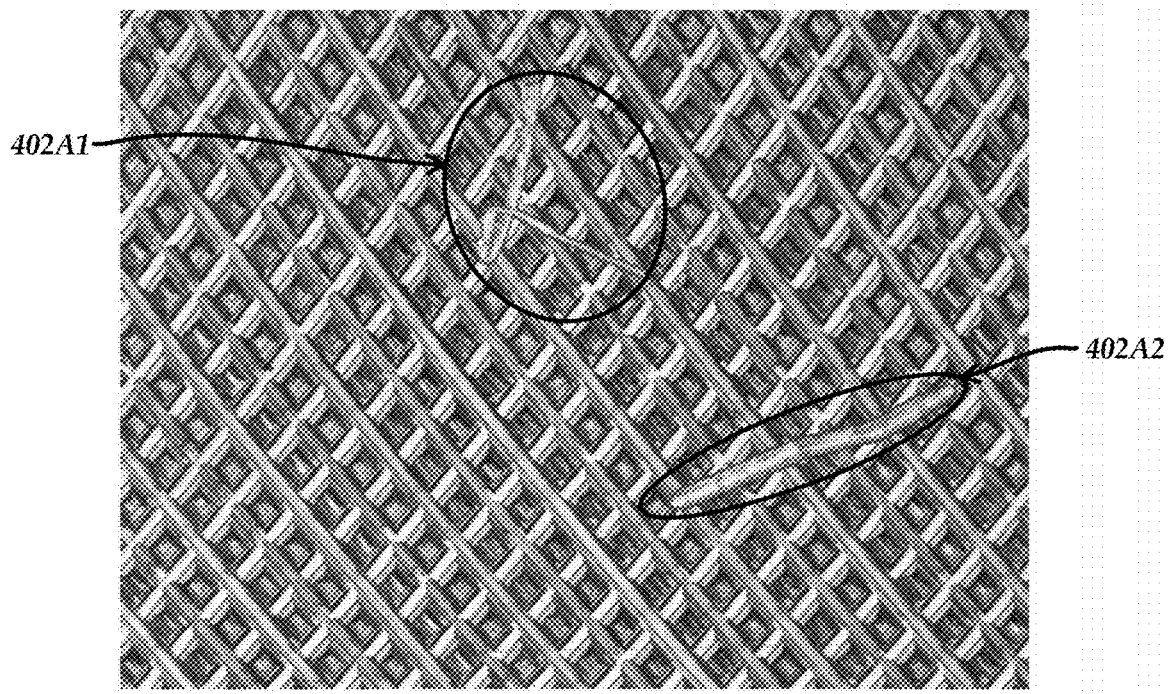
FIGS. 4A-4E are examples of images of portions of workpieces that include defects, as may be acquired using a machine vision inspection system similar to that of FIG. 1.
Figure 4B:
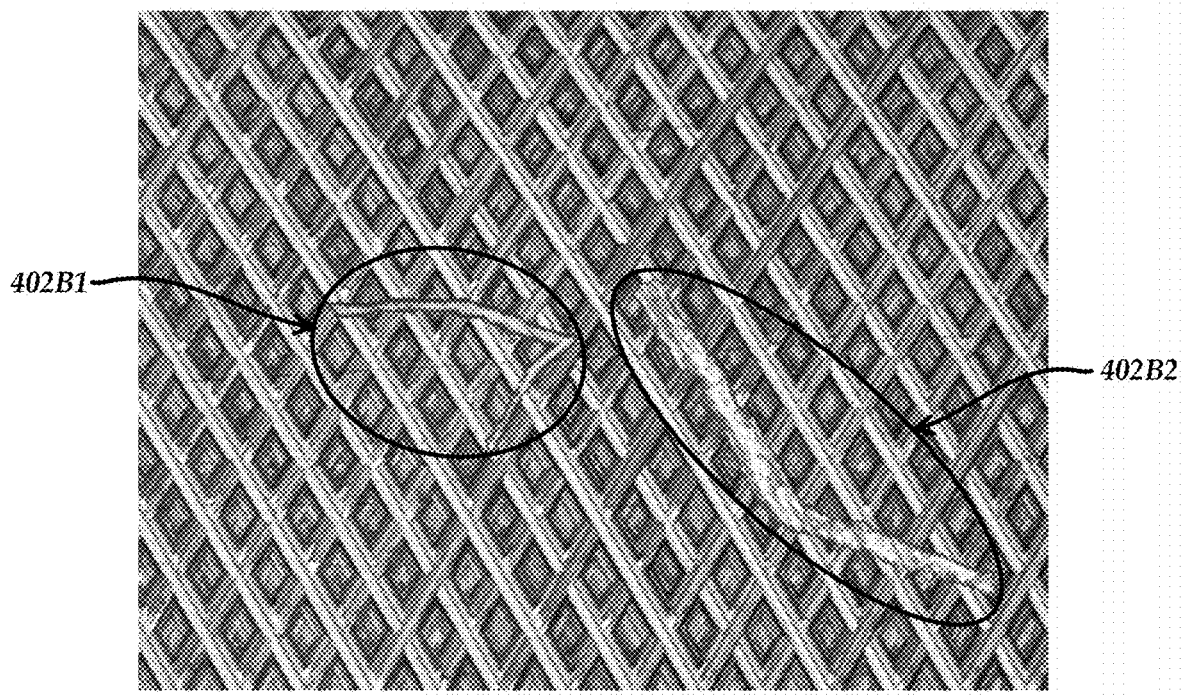
Figure 4C:
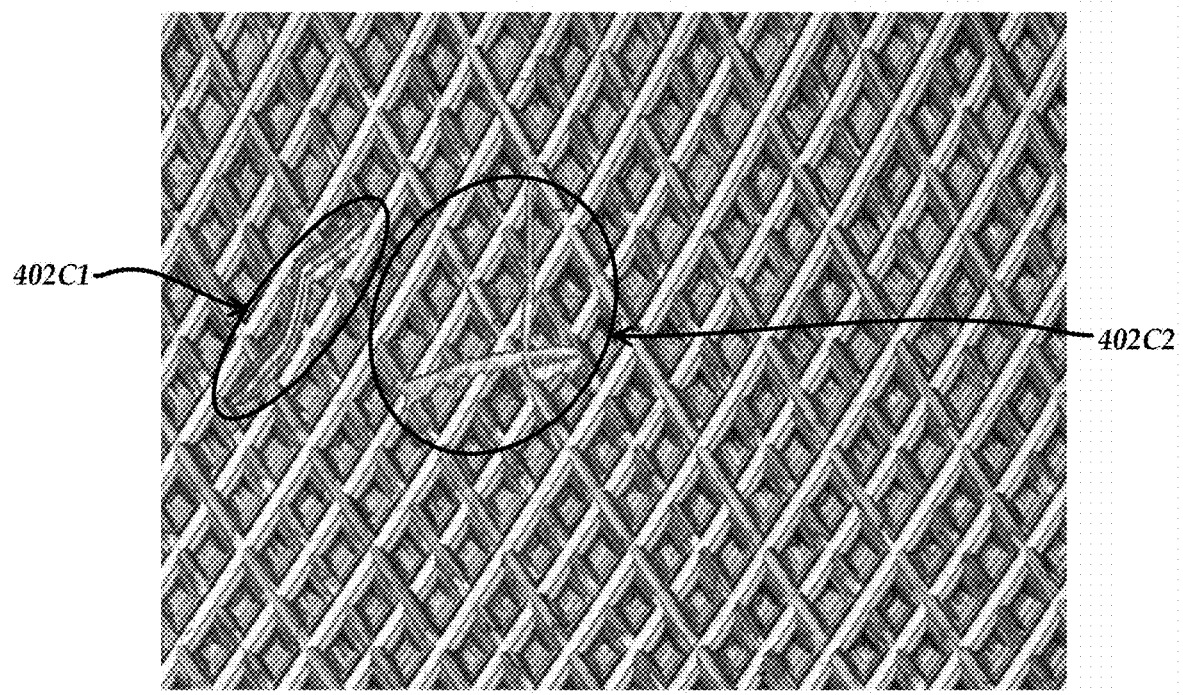
Figure 4D:
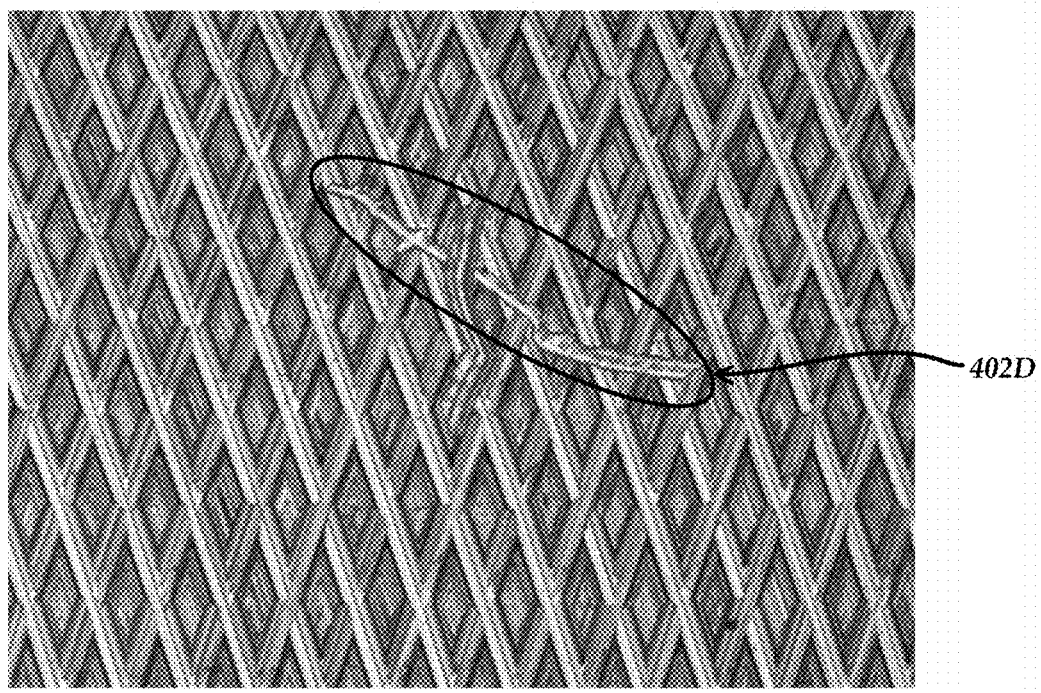
Figure 4E:
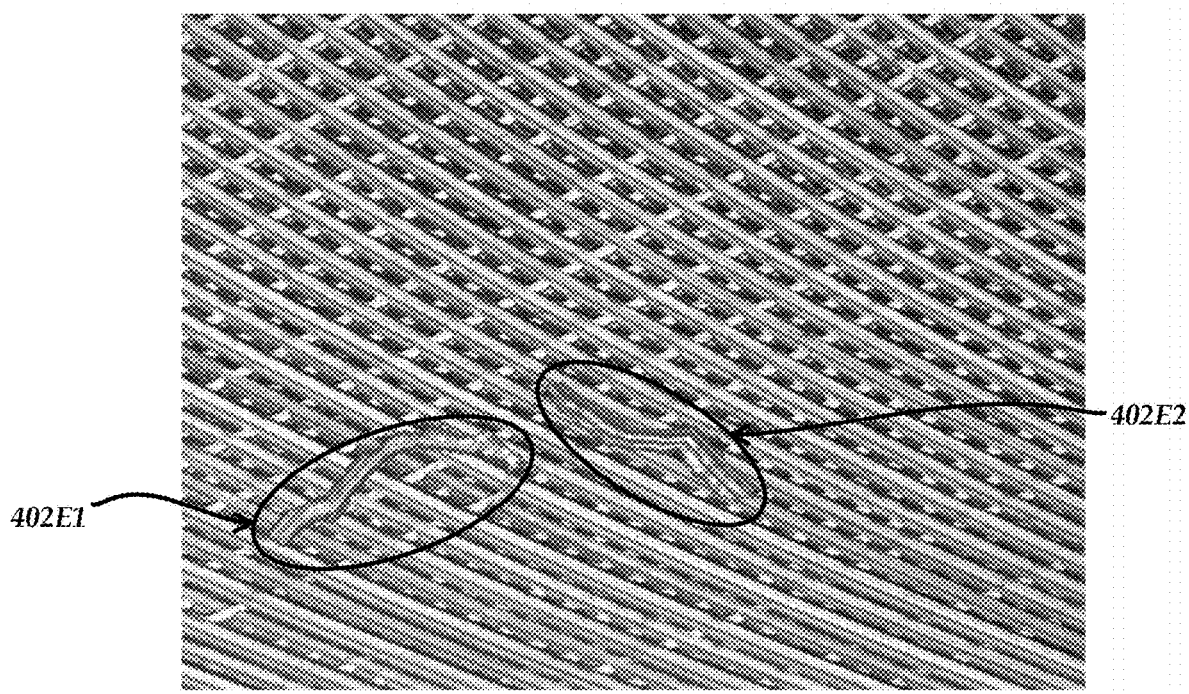

The sections of the machined aluminum plates shown in FIGS. 3A-3F do not include defects. In other words, FIGS. 3A-3F show examples of images of sections of the machined aluminum plate that are "non-defect". In contrast, FIGS. 4A-4E show examples of images of sections of workpieces that include defects. The images shown in FIGS. 4A-4E are similar to those shown in FIGS. 3A-3F, except that the images of FIGS. 4A-4E include defects 402 that are formed on surfaces of machined aluminum plates. The defects 402 in these examples are scratches formed in the surfaces of the machined aluminum plates. More specifically, FIG. 4A illustrates scratch defects 402A1 and 402A2, FIG. 4B illustrates scratch defects 402B1 and 402B2, FIG. 4C illustrates scratch defects 402C1 and 402C2, FIG. 4D illustrates a scratch defect 402D, and FIG. 4E illustrates scratch defects 402E1 and 402E2. As noted above, the variety of characteristics of the defects and workpiece surfaces illustrated in FIGS. 3A-3F and 4A-4E helps illustrate in part why it may be desirable to utilize a number of training images for training the defect detection portion 140dp (e.g., for which the set of training images will typically include a number of defect and non-defect workpiece images).

Figure 5A:
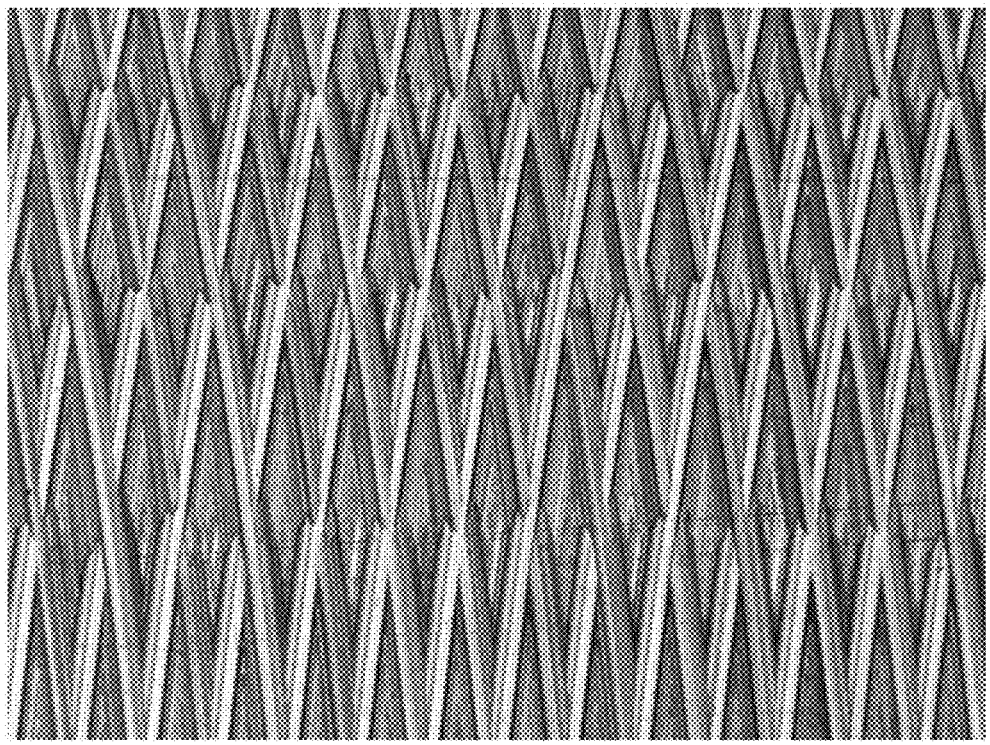
FIGS. 5A-5D are examples of images of similar portions of workpieces, with and without defects, as may be acquired using a machine vision inspection system similar to that of FIG. 1.
Figure 5B:
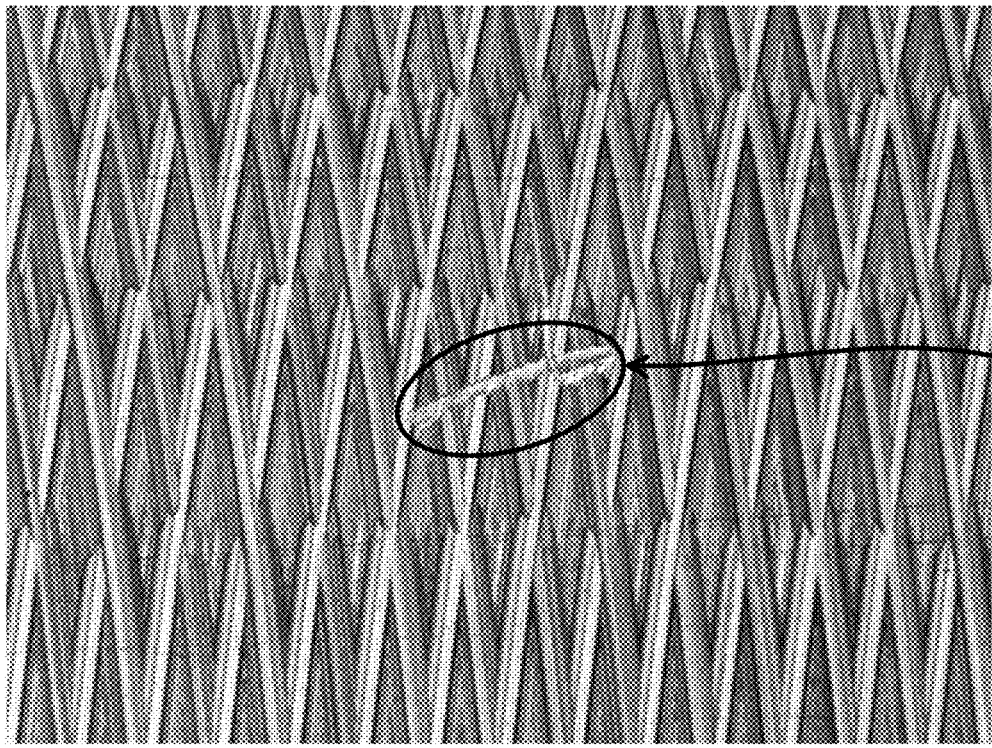
Figure 5C:
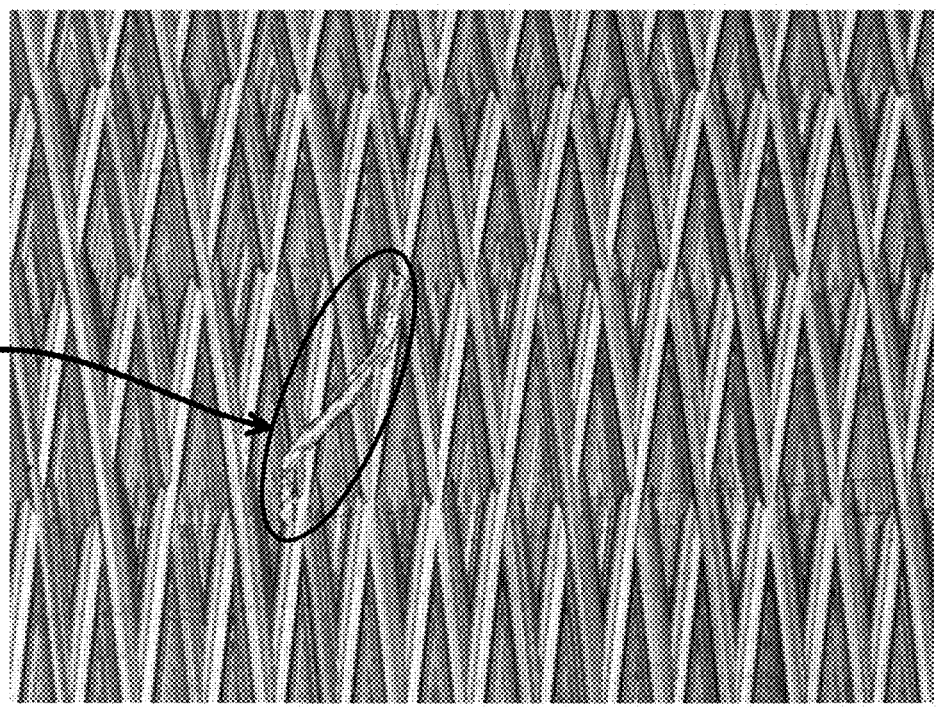
Figure 5D:
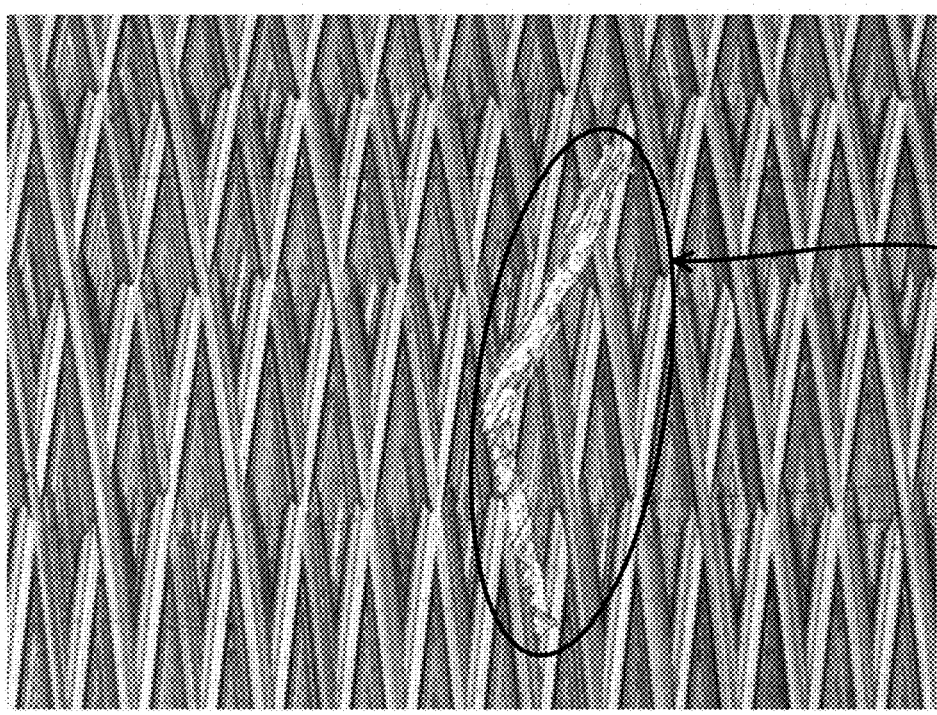

FIGS. 5A-5D are examples of images of similar portions of workpieces, with and without defects, as may be acquired using a machine vision inspection system similar to that of FIG. 1. FIG. 5A shows an example section of the plate that may be classified as "non-defect". FIGS. 5B-5D show examples of images of sections of the plate that may be classified as "defect", wherein each of the images includes a scratch defect 502 (e.g., including the respective scratch defects 502B, 502C and 502D). In the examples of FIGS. 5A-5D, the images are of similar portions of workpieces (e.g., for which the types of machining marks formed on the surfaces of the portions are similar or nominally the same in each image and the primary difference between the images is the characteristics of the respective scratch defects 502B, 502C and 502D). In one example implementation, the images of FIGS. 5A-5C may be included as part of a training set of images for training the defect detection portion 140dp.

In one example implementation, the image of FIG. 5D may be an example of a run mode image which may be analyzed by the defect detection portion 140dp to determine if it should be classified as a defect image or a non-defect image. In various implementations, the defect detection portion 140dp may have been well trained for being able to properly classify the image of FIG. 5D as a defect image (e.g., as having been trained by the training images of FIGS. 5A-5C including the similar portions of workpieces and scratch defects 502B and 502C having certain similar characteristics as the scratch defect 502D). In various implementations, certain additional processes may be performed with respect to the example scratch defect 502D. For example, one or more metrology processes may be performed in conjunction with the defect detection process, for which various dimensions or other characteristics of the example scratch defect 502D may be determined, as will be described in more detail below with respect to FIG. 6.

Figure 6:
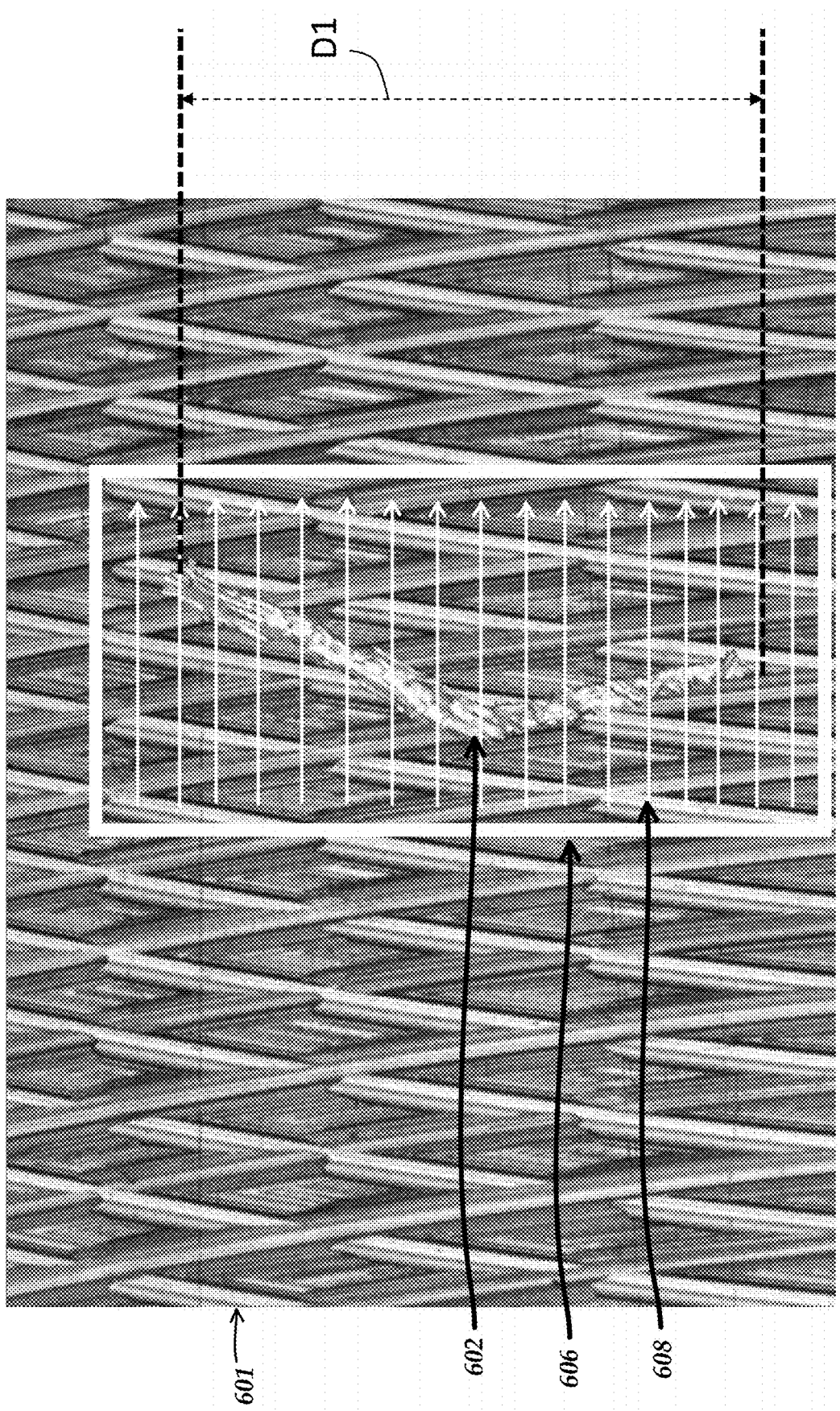
FIG. 6 is a diagram illustrating utilization of one or more video tools for performing metrology operations on an image of a workpiece that includes a defect.

FIG. 6 is a diagram illustrating utilization of one or more video tools for performing metrology operations on an image of a workpiece that includes a defect (e.g., for determining dimensions of the defect, etc.) As illustrated, for an image 601 (e.g., which may be similar or the same as the image of FIG. 5D) that includes a scratch defect 602 (e.g., which may be similar or the same as the scratch defect 502D), a video box tool 606 includes scan lines 608 (e.g., which may also or alternatively be representative of video point tools, etc.) which are utilized for determining the edge locations, dimensions, and/or other aspects of the scratch defect 602. In various exemplary implementations, the video box tool 606 may be sized, positioned and rotated, until the box tool 606 is indicative of, or defines, the region of interest (e.g., the area within the box tool 606), and the arrows shown in FIG. 6 (e.g., representative of scan lines, point tools, etc.) may be utilized to determine the edge(s) of the scratch defect 602. In various exemplary embodiments, the video box tool 606 may generally use one or more conventional edge gradient(s) along the edge(s) of the defect 602 in the region of interest, and the edge(s) of the defect 602 may be determined based on the local magnitudes of the edge gradient(s) along the various scan lines 608, etc.

In various exemplary implementations, such metrology operations may also include performing certain morphological filtering or other filtering (e.g., to distinguish the edges of the scratch from the machined pattern of the workpiece, for which certain types of such filtering are described in U.S. Pat. No. 7,522,763, which is hereby incorporated herein by reference in its entirety). As shown in FIG. 6, in the display area included in the image, the box tool 606 with the scan lines 608 is utilized to determine the edge locations (e.g., the outer edges or perimeter) of the scratch defect 602. Based on such determinations, the video tool and/or other metrology operations may include determining a dimension D1 of the scratch defect (e.g., corresponding to a length or other dimension of the scratch defect 602). In various exemplary implementations, the box tool 606, scan lines 608 and/or other video tools and/or metrology operations may be utilized to determine other dimensions of the scratch defect 602 (e.g., width, depth, etc.) For example, as described above, the video tool portion 143 may include a Z-height measurement tools portion 143z, for which a corresponding video tool or operations may be utilized for determining the Z-height dimensions of the scratch defect (e.g., including determining the depth of the scratch relative to other portions or features of the workpiece surface, etc.)

As part of the general operations of the defect detection portion, some defects that are detected may warrant further metrology or inspection to determine additional defect parameters. For example, as noted above, various types of analysis and/or processing of the defect image that includes the scratch defect 602 may enable determination of the XY position and approximate XY area and/or other dimensions of the defect 602 (e.g., utilizing video tools and/or other operations as described above). If the 3D nature of the potential defect is important (e.g., if a scratch must be deeper than some value to be considered a defect), then the defect detection portion 140dp may initiate a process for utilizing a Z-height measurement tool (e.g., of the Z-height measurement tools portion 143z) or other 3D sensing process (e.g., for acquiring a 3D point cloud of the affected region to determine the depth of the scratch, etc.)

As previously mentioned, the defect detection portion 140dp is configured to automatically assess the performance of a model and provide an indication if additional defect training images are likely to improve performance of the model. In various exemplary implementations, the defect detection portion 140dp is configured to divide a set of available defect images available for training into several groups (e.g., 3 to 10 groups). In various implementations, the defect detection portion 140dp causes a model to be trained with progressively more defect images (e.g., more groups) in a plurality of training cycles and obtains two performance results after each training cycle (e.g., such as a performance result using the set of images used for training and a performance result using defect images that have not been used in the training).

As a simplified example, the images of FIGS. 5A-5D may be divided up such that the images of FIGS. 5A and 5B may be included with other images as part of a first group, the image of FIG. 5C may be included with other images as part of a second group, and the image of FIG. 5D may be included with other images as part of a third group. A first training cycle as implemented by the defect detection portion 140dp may include utilizing the images of the first group (including the images of FIGS. 5A and 5B) as training images, and one or both of the second and third groups of images (including the images of FIGS. 5C and 5D) as testing images. In a second training cycle, the images of the first and second groups (including the images of FIGS. 5A, 5B and 5C) may be utilized as testing images, while the images of the third group (including the image of FIG. 5D) may be utilized as testing images. With additional groups of images, additional training cycles may be performed, and this simplified example illustrates a portion of a process that may be utilized to determine a recommended number of defect images for training the defect detection portion 140dp, as will be described in more detail below with respect to FIGS. 7-12.

Figure 7:
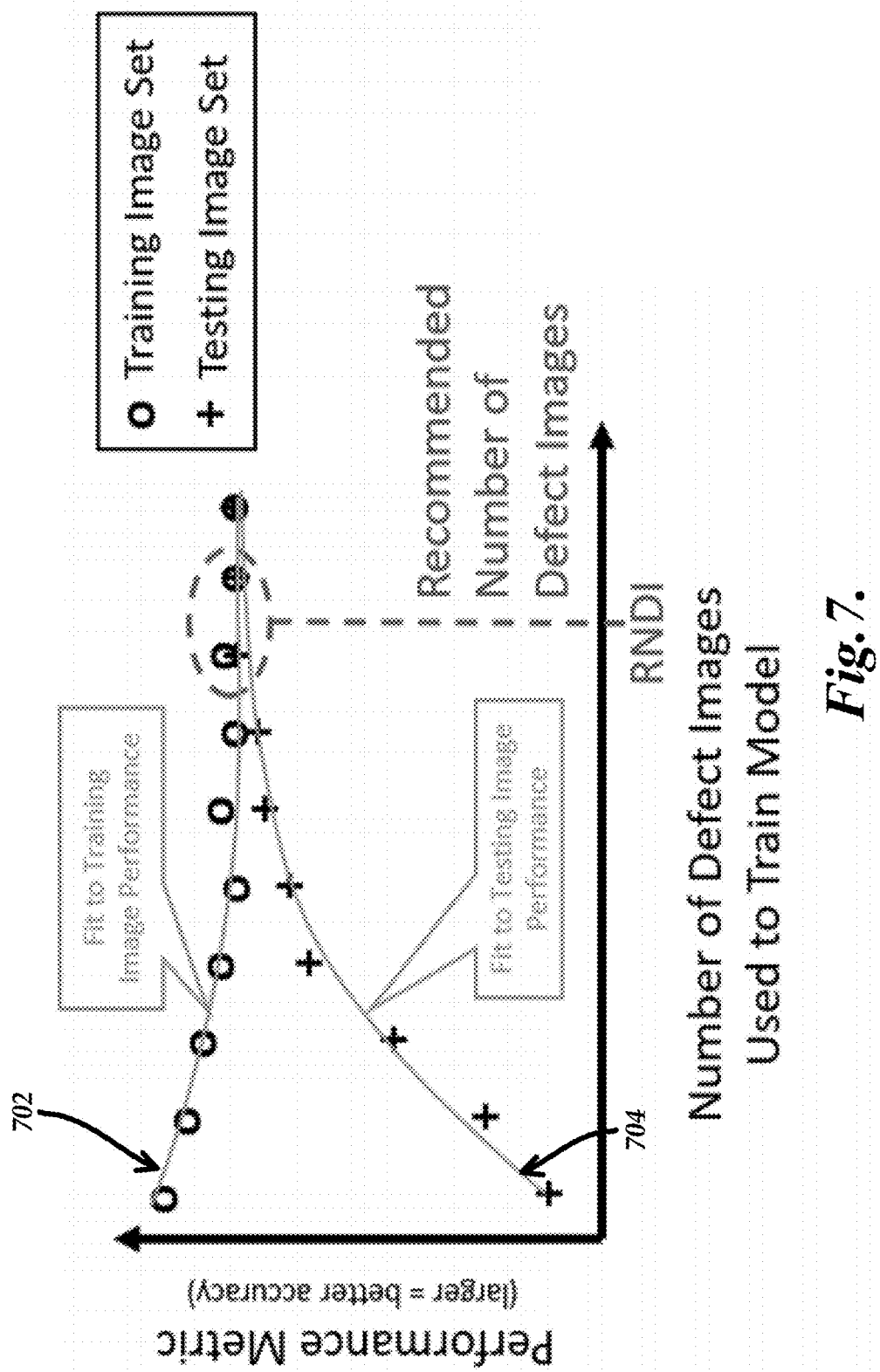
FIG. 7 is a graph illustrating examples of performance curves of a defect detection portion.

FIG. 7 is a graph illustrating examples of performance curves 702 and 704 of a model as utilized by a defect detection portion. In various implementations, there may be several typical trends that may be observed as a function of the number of defect training images provided to a model. Accuracy performance of a set of training images may be high for a low number of training images (e.g., the model memorizes the set of training images). Accuracy performance of the set of training images may fall slightly and become stable as the number of training images provided to the model increases. Also, in comparison to training images, accuracy performance of a set of testing images may increase as the number of training images provided to the model increases and then becomes stable. Accuracy performance of the set of training images and the set of testing image may become very similar for some larger number of training images. Accuracy performance using augmented data and the original set of training images may in some implementations more quickly approach the minimum number of images needed for training. When the number of defect images used to train the model provides performance where both the set of training images and the set of testing images become stable and similar, in various implementations the model may be considered to no longer be likely to provide a significant performance benefit from additional defect training images.

In various exemplary implementations, to aid in determining a recommended number of defect images to achieve excellent model results, a defect detection portion is configured to fit both training performance and testing performance versus the number of defect imagers used for training (i.e., illustrated as curve fits 702 and 704, respectively). As illustrated in FIG. 7, the X-axis value where these two curve fits are near intersection, within some tolerance, may be defined as the recommendation for the number of defect images to be provided for training. Alternatively, the defect detection portion may be configured to only fit the testing image performance and look for a region where the slope nominally approaches zero, within some tolerance.

In addition, the defect detection portion may be configured to train the model with augmented data to get some measure of how much improvement might be obtained given additional images for training. An algorithm implemented by the defect detection portion might train the model with augmented data to make a best determination. In various exemplary implementations, the defect detection portion may be configured to train a simple machine learning algorithm to predict the recommended number of training images from these data rather than using curve fitting and algorithms for different cases.

A typical workflow for using the above model training features of the defect detection portion will now be described. A user imports image data corresponding to a plurality of images of a part into a defect detection model training process. The user then classifies each of the images as non-defect or defect. Next, the user marks pixels that correspond to a defect in each defect image (e.g., marking pixels of a transparent layer overlaid on the original image using paint-like tools to create an image whose colored pixels correspond to the matching defect pixels in the original image). The user then selects a model training option that provides recommendations for improved performance. Alternatively, the model training option may be a default option. Finally, the user initiates model training (e.g., button push). In various implementations, all subsequent defect detection model training and analysis functionality may be automatic (e.g., requiring no further user input).

The defect detection portion then divides available non-defect and defect images into a number of groups (e.g., 3 or more) with a similar number of defect images and non-defect images in each group. For example, if the user has provided 80 defect images and 64 non-defect images, the defect detection portion creates 4 groups of images labeled: A, B, C, and D, with each group having a unique randomly selected set of 20 defect images and 16 non-defect images.

Next, the defect detection portion trains the model using group A images only, obtains a model performance metric (e.g., accuracy) using group A images (training image performance for training with 20 defect images), and also obtains the model performance metric using either group D images or using groups B, C, and D collectively. In either case this provides the testing image performance for training with 20 defect images. In various exemplary implementations, the performance metrics include a percentage of defect images accurately classified as being a defect image (e.g., the number of defect images accurately classified as being a defect image divided by the total number of defect images), a percentage of non-defect images accurately classified as being a non-defect image (e.g., the number of non-defect images accurately classified as being a non-defect image divided by the total number of non-defect images), or a combination of the two. Additionally or alternatively, the performance metrics may take into account the percentage of false positive detections (e.g., the number of non-defect images inaccurately classified as being a defect image divided by the total number of non-defect images), the percentage of false negative detections (e.g., the number of defect images inaccurately classified as being a non-defect image divided by the total number of defect images), or a combination of the two.

The defect detection portion then trains the model using group A and group B images and then obtains a model performance metric (e.g., accuracy) using group A and B images (training image performance for training with 40 defect images), and also obtains the performance metric using either group D images or using groups C and D collectively. In either case this provides the testing image performance for training with 40 defect images.

Subsequently, the defect detection portion trains the model using group A, B, and C images and then obtains a model performance metric (e.g., accuracy) using group A, B, and C images (training image performance for training with 60 defect images) and obtains the model performance metric using either group D images, providing the testing image performance for training with 60 defect images.

The defect detection portion then trains the model using group A, B, C, and D images and then obtains model accuracy (performance) using group A, B, C, and D images. In other words, training image performance is obtained for training with all 80 defect images.

Next, the defect detection portion fits the training image performance versus number of defect images used for model training results with an appropriate curve. The resulting training fitted curve is extrapolated to larger values of number of defect images used to train the model.

The defect detection portion then fits the testing image performance versus number of defect images used for model training results with an appropriate curve. The resulting testing fitted curve is extrapolated to larger values of number of defect images used to train the model.

The defect detection portion then determines (e.g., utilizing a convergence algorithm) a value of the number of defect images used to train the model for which the testing fitted curve and the training fitted curve converge toward each other. A convergence algorithm may use distance between the curves, intersection location, and slope (e.g., approaching zero) as metrics for determining convergence. The convergence algorithm determines the number of defect images used to train the model where best convergence is estimated or expected to occur. In various implementations, this value may be determined as the Recommended Number of Defect Images (RNDI) for model training. In certain alternative implementations (e.g., as will be described in more detail below with respect to FIG. 13), rather than utilizing a convergence algorithm, other techniques may be utilized for determining a RNDI and/or other general indications of when a sufficient number of defect images have been provided for the training, etc. For example, as indicated in FIG. 7, as the number of defect images utilized for training increases, the performance curve 704 is observed to generally have a decreasing slope, and for which the RNDI corresponds to portion where adding additional defect images for training results in relatively little improvement in the performance. In accordance with such principles, the RNDI and/or other sufficient number of defect images for training may be determined, which may correspond to a portion of a performance curve where the slope has correspondingly decreased, such as to a certain level where adding additional defect images for training results in relatively little (e.g., nominally negligible) improvement in the performance. In various implementations, in accordance with such techniques, certain data corresponding to only a single performance curve may be needed/utilized (e.g., data corresponding to the performance curve 704).

In order to reserve some defect images for model validation and testing, in various implementations, it may be desirable to have additional defect images available that are not used for model training. Accordingly, the defect detection portion may in some implementations be configured to inform the user to provide a predetermined amount (e.g., 15%) more defect images than the Recommended Number of Defect Images (RNDI) for model training. In other words, a value may be recommended for the number of defect images used for training, that is determined by multiplying the determined RNDI by the predetermined amount (e.g., 1.15).

If the user has supplied a number of defect images greater than or equal to the recommended number, the defect detection portion may be configured to generate a message informing the user that supplying additional defect images for training is unlikely to significantly improve model accuracy/performance. If the user has supplied a number of defect images less than the recommended number, then the defect detection portion may be configured to generate a message informing the user that additional defect images should continue to be provided for the training. In some instances where a RNDI is determined, such a message may indicate how many additional defect images are recommended to be supplied for training to achieve excellent model accuracy/performance.

Accordingly, the defect detection portion can inform a user with reasonable certainty whether or not providing additional training images is likely to provide significant improvement in model performance, for which such determinations are based upon model training performance using a specific user-provided set of images rather than a generic recommendation which may be imprecise. In some implementations (e.g., where a RNDI is determined, etc.), the defect detection portion can provide a user with an estimate of how many defect images are desired for the user's specific image data set to obtain desired performance (e.g., approaching the best performance that a particular model can provide). In various implementations, the defect detection portion may not be able to confidently extrapolate a recommendation for the minimum number of defect images needed when that number is significantly higher than the total number of defect images currently provided. In such instances, the defect detection portion may provide a message or other indication that the user should provide a preset number of additional images, with a high confidence that this number of images will improve the model defect detection prediction accuracy and possibly allow for a confident estimate of how many images are needed for best accuracy. In addition, the defect detection portion can perform such assessments automatically without any user assistance other than providing labeled defect images for analysis.

Figure 8A:
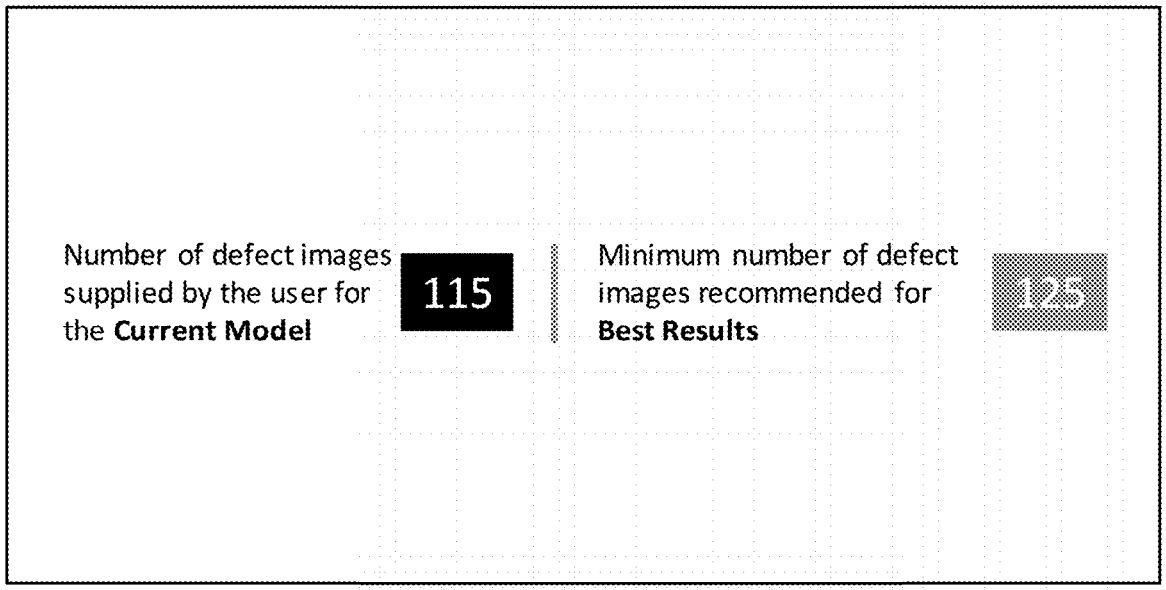
FIGS. 8A and 8B show examples of messages that may be generated by a machine vision inspection system similar to that of FIG. 1.
Figure 8B:
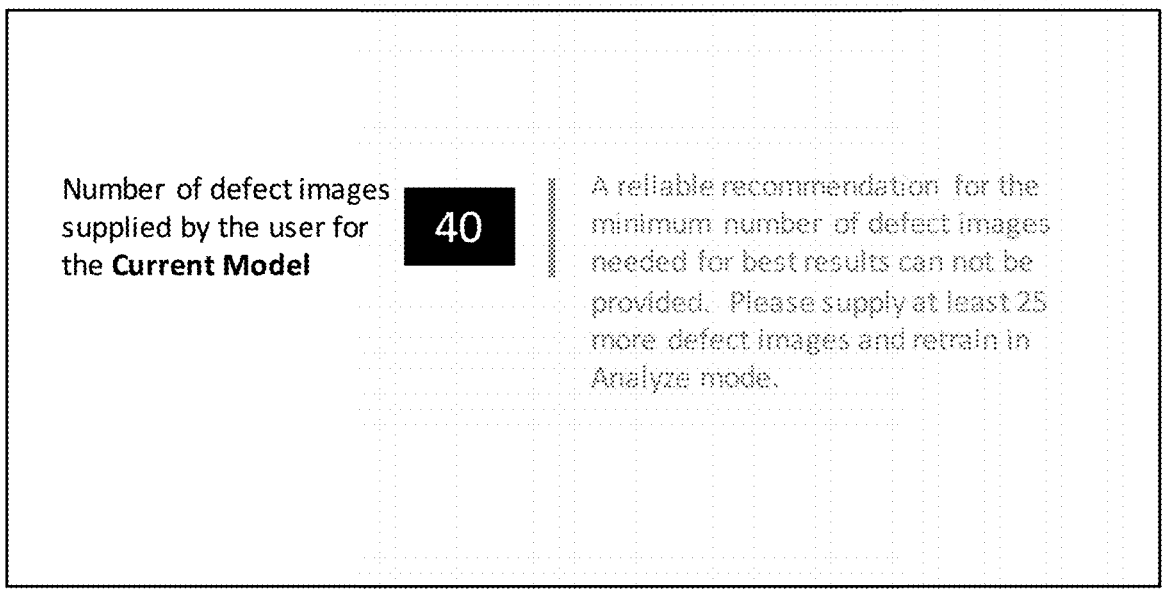

FIGS. 8A and 8B show examples of certain types of messages that may be generated and displayed to a user in relation to a RNDI. The message shown in FIG. 8A indicates that the number of defect images supplied by the user for a current model is 115, and that the minimum number of defect images recommended for best results is 125. Accordingly, the user is informed that the current model should be trained with 10 (i.e., 125-115) additional defect images which the user should provide to improve the performance of the model.

The message shown in FIG. 8B indicates that the number of defect images supplied by the user for a current model is 40, that a reliable recommendation for the minimum number of defect images needed for best results cannot be provided, that the user should supply at least 25 more defect images, and that the model should be retrained in an analyze mode (e.g., training or learning mode) using 25 additional defect images. Accordingly, the user is informed that the current model accuracy performance can likely be improved significantly with additional defect training image and the user is advised to not use the current trained model for defect detection until the model is retrained with at least 25 additional defect images, after which a reliable recommendation for the minimum number of defect images needed for best results may be able to be provided.

Figure 9:
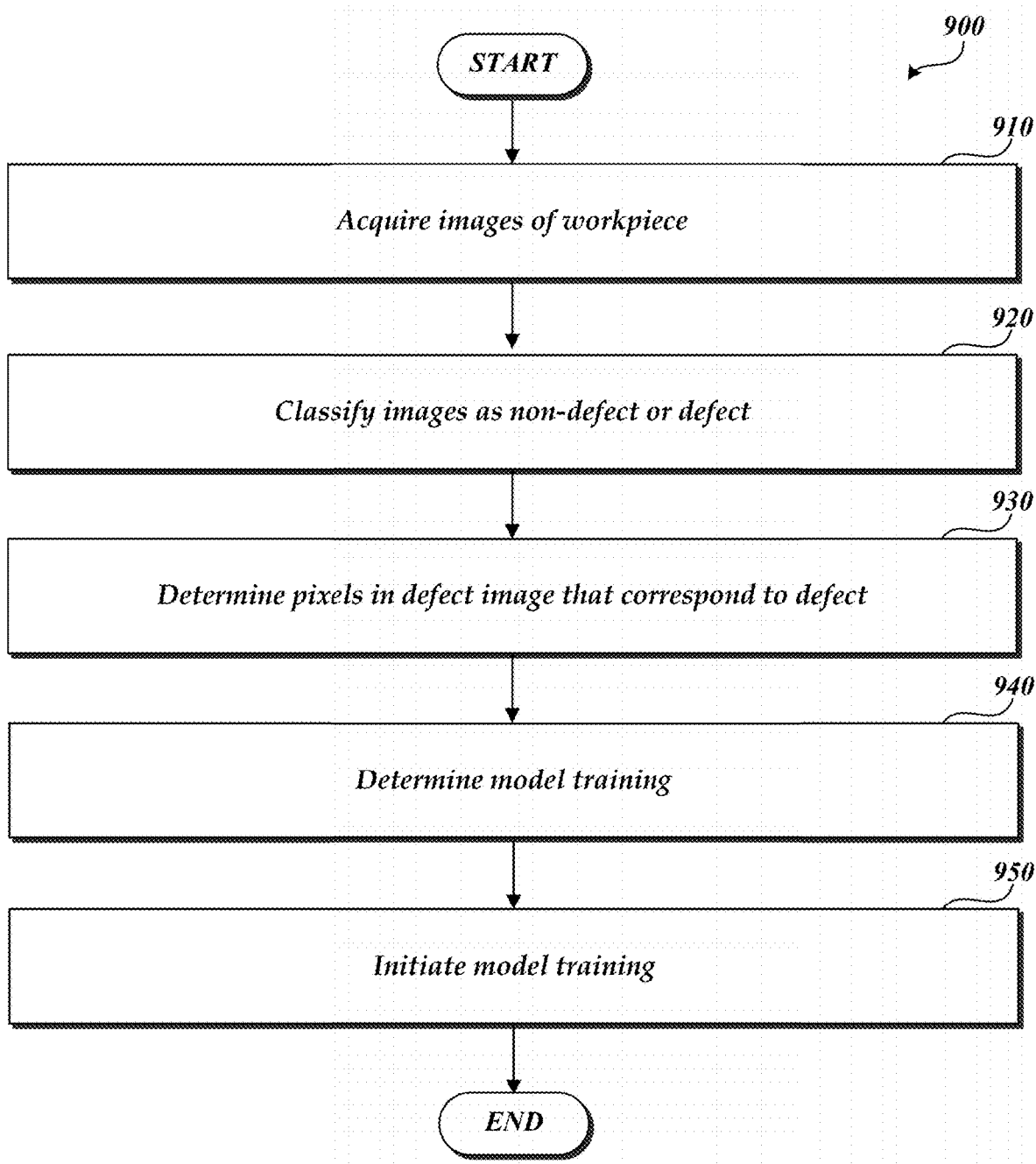
FIG. 9 shows a flow diagram of a method for operating a machine vision inspection system similar to that of FIG. 1

FIG. 9 shows a flow diagram of a method 900 for operating a machine vision inspection system similar to that of FIG. 1. The method 900 begins at 910. At 910, a plurality of images of one or more workpieces is acquired. For example, the camera system 260 acquires a plurality of images of workpieces 20. The method 900 then proceeds to 920.

At 920, each of the images of the workpieces acquired at 910 is classified as non-defect or defect. For example, a user visually inspects each image acquired at 910. In various implementations, if an image is deemed to not include a defect, a predetermined field included in a header of a file that includes image data corresponding to the image is set to a predetermined value that indicates the image is a non-defect image (e.g., 0). If an image is deemed to include a defect, the predetermined field included in the header of the file that includes image data corresponding to the image is set to a predetermined value that indicates the image is a defect image (e.g., 1). The method 900 then proceeds to 930.

At 930, for each of the images of the workpieces that is classified as a defect at 920, a plurality of pixels that correspond to a defect is determined. For example, a user visually inspects each image classified as a defect, and then uses a software tool that enables the user to set a color value (e.g., grayscale value) to a predetermined value (e.g., 255) of each pixel in an overlaid transparent image corresponding to each defect. The method 900 then proceeds to 940.

At 940, model training is determined. For example, the defect detection portion divides the images acquired at 910, based on how those images are classified at 920, into a plurality of groups in a manner similar to that described above in connection with FIG. 7. Also, a user may select a particular one of a plurality of models included in the defect detection portion using a graphical user interface. The method 900 then proceeds to 950.

At 950, model training is initiated based on the model training determined at 940. For example, such initiation may be performed automatically, or a user may push a button or select an icon using a graphical user interface, which causes the model training to begin based on the model training determined at 940. The method 900 then ends.

Figure 10:
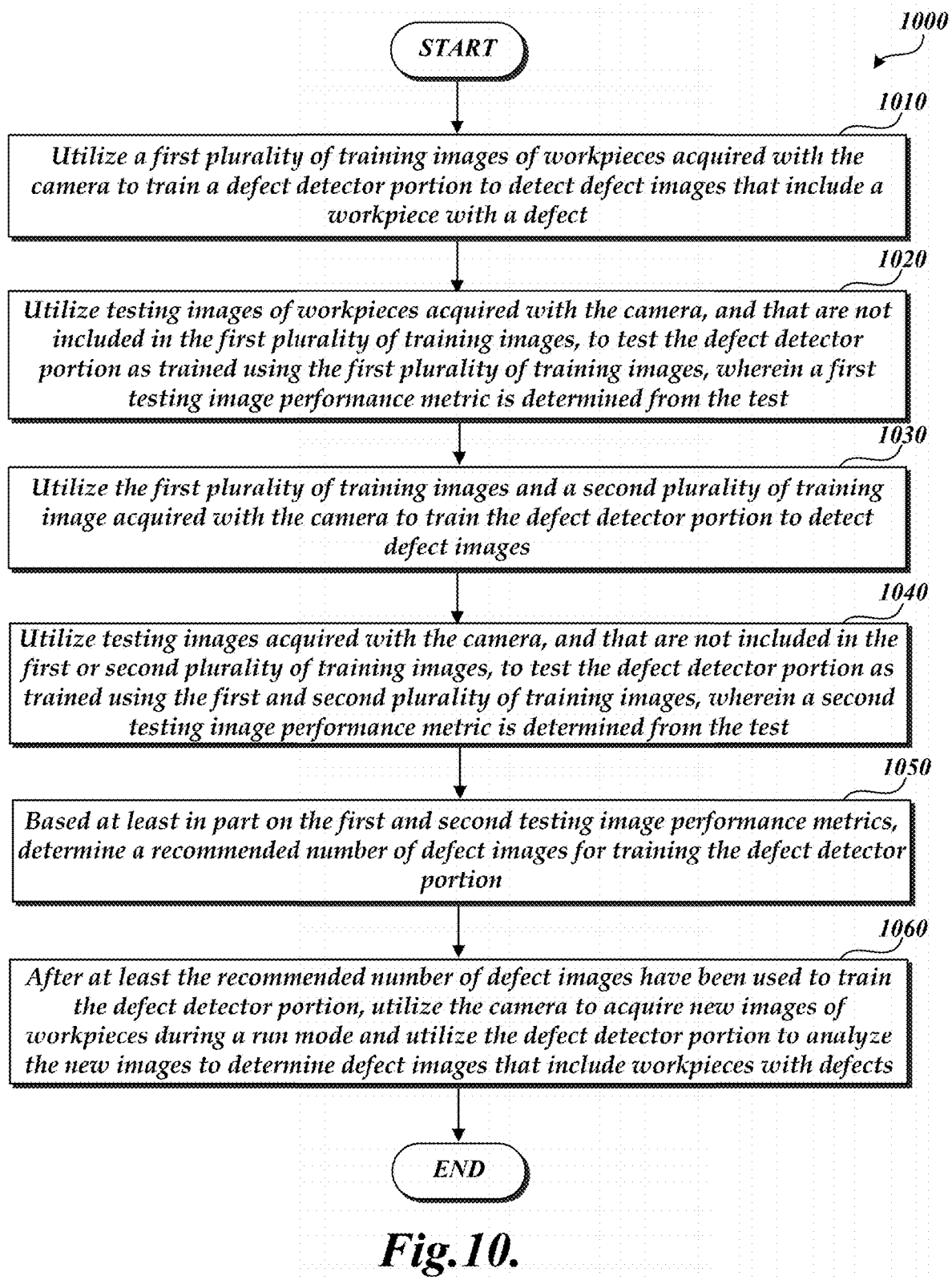
FIG. 10 shows a flow diagram of a method for operating a machine vision inspection system similar to that of FIG. 1

FIG. 10 shows a flow diagram of a method 1000 for operating a machine vision inspection system similar to that of FIG. 1. The method 1000 begins at 1010. At 1010, a first plurality of training images of one or more workpieces acquired with a camera (e.g., camera system 260) is utilized to train a defect detection portion (e.g., defect detection portion 140dp) to detect defect images that include a workpiece with a defect. The method 1000 then proceeds to 1020.

At 1020, a first plurality of testing images of the workpieces acquired with the camera, and not included in the first set of training images, is utilized to test the defect detection portion as trained using the first set of training images. A first testing image performance metric is determined from the test. For example, the performance metric may be calculated by dividing the number of training images accurately classified as being a defect image by the total number non-defect images in the first plurality of testing images. The method 1000 then proceeds to 1030.

At 1030, the first plurality of training images and a second plurality of training image acquired with the camera are utilized to train the defect detection portion to detect defect images. The method 1000 then proceeds to 1040.

At 1040, a second set of testing images acquired with the camera, and not included in the first or second plurality of training images, is utilized to test the defect detection portion as trained using the first and second plurality of training images. A second testing image performance metric is determined from the test. For example, the performance metric may correspond to the accuracy of the defect detection portion, which may be calculated by dividing the number of defect images correctly classified as being a defect image by the total number defect images included the second set of testing images. The method 1000 then proceeds to 1050.

At 1050, based at least in part on the first and second testing image performance metrics, a recommended number of defect images for training the defect detection portion is determined. For example, the defect detection portion fits a training image performance versus number of defect images used for model training results with an appropriate curve, fits a testing image performance versus number of defect images used for model training results with an appropriate curve, and utilizes a convergence algorithm to find a value of the number of defect images used to train the model for which the testing fitted curve and the training fitted curve converge toward each other, in a manner similar to that described above in connection with FIG. 7. The method 1000 then proceeds to 1060.

At 1060, after at least the recommended number of defect images have been used to train the defect detection portion, the camera is utilized to acquire new images of workpieces during a run mode, and the defect detection portion is utilized to analyze the new images to determine defect images that include workpieces with defects (e.g., including classifying the new images a defect images or non-defect images). The method 1000 then ends.

Figure 11:
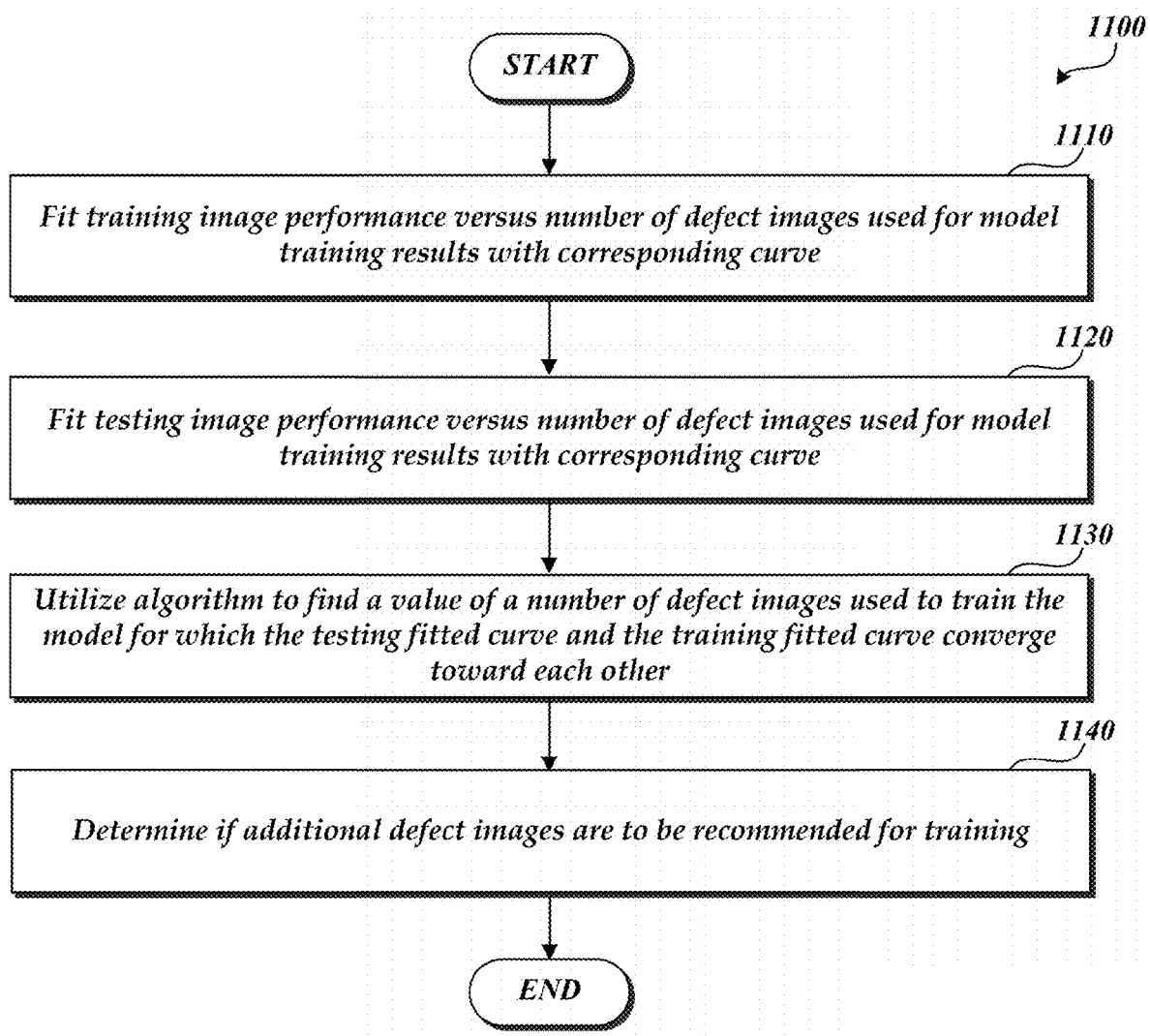
FIG. 11 shows a flow diagram of a method for operating a machine vision inspection system similar to that of FIG. 1.

FIG. 11 shows a flow diagram of a method 1100 for operating a machine vision inspection system similar to that of FIG. 1. For example, in a manner similar to that described above in connection with FIG. 7, a defect detection portion is trained using a plurality of groups of training images, wherein each group of training images includes a predetermined number of defect images. More particularly, the defect detection portion is trained during a series of training cycles. During the first training cycle, the defect detection portion is trained with a first group of training images. During the second training cycle, the defect detection portion is trained with the first group of training images along with a second group of training images. During the third training cycle, the defect detection portion is trained with the first and second groups of training images along with a third group of training images. During the fourth training cycle, the defect detection portion is trained with the first, second, and third groups of training images along with a fourth group of training images. After each training cycle, the accuracy of the defect detection portion is determined using two sets of images, including the set of training images used to train the defect detection portion in the previous training cycle, and a set of testing images not used to train the defect detection portion in the previous cycle.

The method 1100 begins at 1110. In various implementations, the method 1100 of FIG. 11 may be a specific example of certain processes performed as part of 1050 of FIG. 10. As shown in FIG. 11, at 1110, training image performance versus number of defect images used for model training results are fit with a corresponding curve. For example, the accuracy of the defect detection portion determined after each training cycle using the set of training images used to train the defect detection portion in the previous training cycle is fit with a corresponding curve using conventional curve fitting techniques. The method 1100 then proceeds to 1120.

At 1120, testing image performance versus number of defect images used for model training results are fit with a corresponding curve. For example, the accuracy of the defect detection portion determined after each training cycle using the set of testing images not used to train the defect detection portion in the previous training cycle is fit with a corresponding curve using conventional curve fitting techniques. The method 1100 then proceeds to 1130.

At 1130, an algorithm is utilized to find a value of a number of defect images used to train the model for which the testing fitted curve and the training fitted curve converge toward each other. For example, in a manner similar to that described above in connection with FIG. 7, the defect detection portion utilizes a convergence algorithm that takes into account the distance between the testing fitted curve and the training fitted curve and obtains the value of the number of defect images used to train the model for which the testing fitted curve and the training fitted curve converge toward each other such that the distance between the curves is less than or equal to a predetermined value. The method 1100 then proceeds to 1140.

At 1140, whether additional defect images are to be recommended for training is determined. For example, the defect detection portion compares the number defect images currently used to train the defect detection portion to the value of the number of defect images used to train the model for which the testing fitted curve and the training fitted curve converge toward each other as found at 1130. If the defect detection portion determines that the number defect images currently used to train the defect detection portion is greater than or equal to the value of the number of defect images used to train the model for which the testing fitted curve and the training fitted curve converge toward each other as found at 1130, the defect detection portion determines that additional defect images are to not be recommended for training. If not, the defect detection portion determines that additional defect images are to be recommended for training. The method 1100 then ends.

Figure 12:
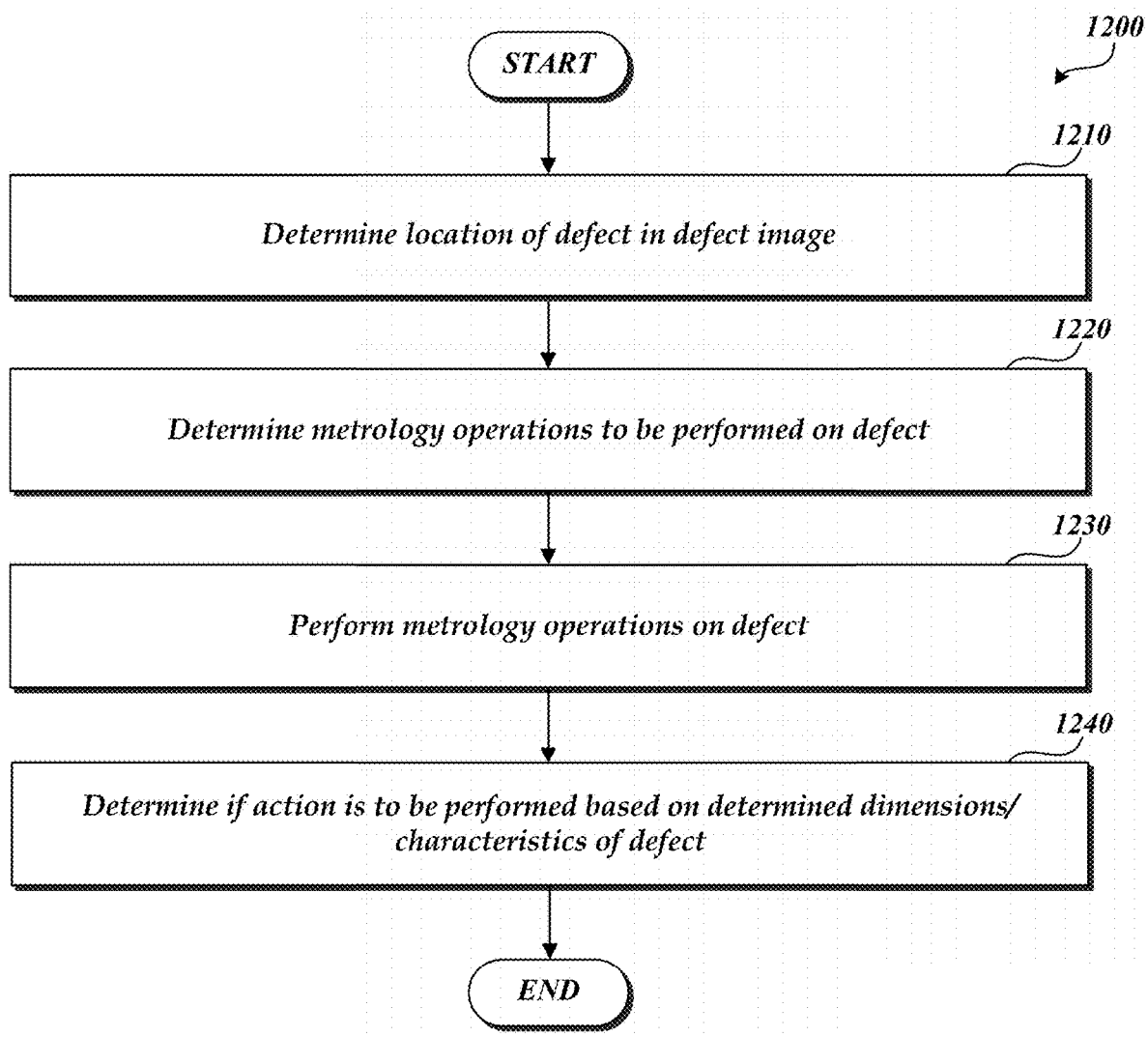
FIG. 12 shows a flow diagram of a method for operating a machine vision inspection system similar to that of FIG. 1.

FIG. 12 shows a flow diagram of a method 1200 for operating a machine vision inspection system similar to that of FIG. 1. The method 1200 begins at 1210. At 1210, a location of a defect in a defect image is determined. For example, a defect detection portion determines the location of the defect 502D shown in FIG. 5D. The method 1200 then proceeds to 1220.

At 1220, one or more metrology operations to be performed on the defect are determined. For example, it may be determined what dimensions/characteristics of defect are to be determined/measured, such as depth, length, width, etc. (e.g., as described above with respect to FIG. 6). In one specific example implementation, the defect detection portion may determine that a metrology operation that acquires a 3D point cloud of a region including the defect 502D and a metrology operation that determine a maximum depth of the defect using the 3D point cloud are to be performed. The method 1200 then proceeds to 1230.

At 1230, the one or more metrology operations determined at 1220 are performed on the defect 502D. For example, a video tool and/or other metrology processes may be utilized to determine one or more dimensions/characteristics of the defect 502D. In one specific example implementation, the defect detection portion may perform a metrology operation that acquires the 3D point cloud of the region including the defect 502D and a metrology operation that determines the maximum depth of the defect using the 3D point cloud. The method 1200 then proceeds to 1240.

At 1240, whether an action is to be performed is determined based on dimensions and/or characteristics determined at 1230. For example, if a dimension of the defect 502D is determined to be above a threshold, an action may be performed (e.g., an alert may be provided, the workpiece may be sent to scrap, etc.) In one specific example implementation, the defect detection portion may determine whether the maximum depth of the defect 502D is greater than or equal a predetermined threshold value. If the defect detection portion determines that the maximum depth of the defect 502D is greater than or equal to the predetermined threshold value, the defect detection portion may determine that a message is to be generated and displayed (e.g., indicating information about the defect and/or that the workpiece should be send to scrap, etc.) If a dimension or other characteristic (e.g., of the defect 502D) is not above a threshold, the defect detection portion may determine that no action is to be performed. The method 1000 then ends.

Figure 13:
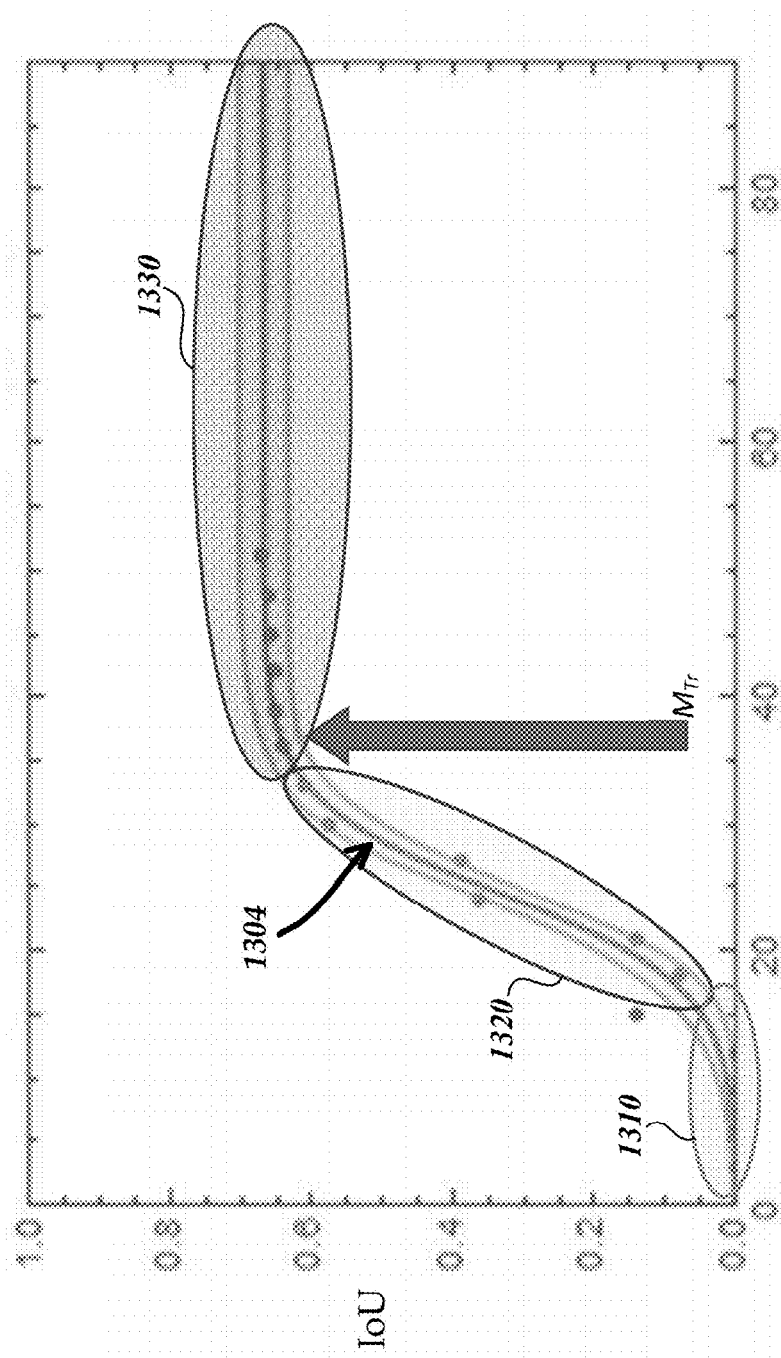
FIG. 13 is a graph illustrating an example of a performance curve of a defect detection portion.

FIG. 13 is a graph illustrating an example of an accuracy performance curve 1304 of a defect detection portion. As noted above, and as will be described in more detail below with respect to FIG. 13, in various implementations it may be desirable to train a defect detection portion until a certain accuracy is achieved (e.g., as approaching a potential maximum accuracy of the defect detection portion for being able to identify/classify defects and/or defect pixels for a given image defect/background data set, etc.) In regard to such training, it may be desirable to determine how many defect images may be needed for the training to obtain the certain accuracy (e.g., as may correspond to an accuracy at which utilization of additional defect images for training is not expected to further significantly increase the accuracy). In various implementations, such an accuracy may be designated as corresponding to at least a certain percentage (e.g., 90%, 95%, 97.5%, etc.) of a maximum value (e.g., a maximum IoU value) that is expected to be reached for the fitted accuracy performance curve (e.g., accuracy performance curve 1304), such that providing a large number (e.g., 500) or an infinite number of additional defect images for the training would only be expected to produce a relatively small percentage increase (e.g., 10%, 5%, 2.5%, etc.) in the accuracy (e.g., relative to the maximum value, etc.) In relation to a corresponding asymptote of the fitted accuracy performance curve (e.g., accuracy performance curve 1304), in various implementations, different techniques may be utilized for such determinations. For example, such techniques may include determining a slope of the curve, checking errors with a model on the top portion of the curve, and/or defining the asymptotic portion of the curve (e.g., according to a maximum value of a negative curvature) and checking to see if the current data may be beyond that point (e.g., or other point as described above) of the fitted curve (or checking the data itself or some combination of the two). As some other examples, a DNN, or SVM or other machine learning tool may be trained to provide corresponding indications, etc. In certain implementations, in accordance with such determinations the number of defect images needed for training may vary (e.g., depending on the specific image data set, and for which in some example implementations the number may vary from 20 to 300 defect images) and for which the number may be dependent on various factors (e.g., such as variations in visual characteristics of the defects and backgrounds, image quality, etc.), as will be described in more detail below.

In the graph of FIG. 13, the x-axis corresponds to a number of defect images used for training, and the y-axis corresponds to an Intersection over Union (IoU) score (i.e., one of several commonly used accuracy metrics used to assess the correctness of semantic segmentation of objects using neural networks). In various implementations, the IoU pixel-level accuracy score varies from 0 to 1, where 1 is perfect classification of all pixels in the images as normal or defect. The performance curve 1304 is fit to determined data points (e.g., for which certain numbers of defect images used for training are indicated to produce certain IoU scores) and correspondingly indicates a performance of the defect detection portion for the unique image data set. In various implementations, the indicated lines above and below the performance curve 1304 may indicate a level of certainty of the curve fit. In various implementations, the IoU score may start at the origin and may generally increase with more defect images used for training up to some value, after which little improvement is seen to occur. In various implementations, the IoU score may not approach 1 (i.e., as corresponding to perfect classification, and for which in some instances imperfectly labeled defects and/or defect pixels, such as may be labeled by a human in the defect images used for training, may generally keep the score below a value of 1). In various implementations, other metrics similar to IoU, such as the F1 score (Sørensen-Dice coefficient), commonly known to those skilled in the art of neural network classification models could also be used effectively as the measure of accuracy performance in this method.

In various implementations, a performance curve for a defect detection portion as corresponding to a unique image data set may have a shape similar to a sigmoidal curve (e.g., a logistic growth curve). In such instances, there may generally be a point (i.e., corresponding to a certain number of defect images) at which utilization of additional defect images for training may provide relatively little improvement in the performance. Such a number of defect images as utilized for training may generally be designated as $M_{TR}$, as indicated in FIG. 13 (and in some instances may generally be representative of a desired minimum number of defect images to be used for the training of the defect detection portion). In the specific example of FIG. 13, the $M_{TR}$ corresponds to around 37 defect images used for the training. As noted above, in various implementations such analysis may enable an indication to be provided to a user (e.g., in relation to a current number of defect images that have been utilized for the training) as to whether additional defect images should continue to be provided for training the defect detection portion.

In various implementations, due to the expectation that the performance curve may approximately be a sigmoidal type curve, this information may help determine when a good fit for the performance curve (e.g., performance curve 1304) has been achieved (e.g., as corresponding to a good fit to the data points indicating the performance of the defect detection portion). For example, in various implementations, a good fit may be considered to have been achieved when there are several (e.g., 3 or more) data points that are indicated to correspond to the "top" portion of the sigmoid shaped performance curve (e.g., which in some instances may correspond to data points whose x-values are greater than $M_{Tr}$ as obtained from the fit). In the illustration of FIG. 13, the performance curve 1304 is shown to have a bottom portion 1310, a rising slope portion 1320, and a top portion 1330. In this example, the top portion 1330 is shown to include 6 data points, for which there may correspondingly be a relatively high confidence in the estimate of the minimum number $M_{Tr}$ of defect images needed for the training to achieve the desired performance. In various implementations, there may be fewer data points corresponding to the top portion of the performance curve (e.g., in some instances with as few as 2 or 3 or 4 data points, depending on the spacings/differences in the number of defect images corresponding to each of the data points, etc.) In various implementations, data points at a top portion of a performance curve may correspond to a slope that is relatively flat (e.g., approaching zero) and/or for which the slope may otherwise be only a small percentage (e.g., less than 5%) of a maximum slope that occurs during the rising slope portion of the performance curve (e.g., with a slope at each point in some instances being considered to correspond to an amount of performance increase for each additional defect image utilized for the training, etc.)

It will be appreciated that in accordance with such analysis, various indications may be provided (e.g., to a user) to indicate whether or not additional defect images should be provided for the training. By providing such indications to a user, the user is informed if they have supplied enough defect images for the training to achieve the desired performance results (e.g., as may be approaching nearly the best possible performance results) for the defect detection portion in relation to the specific defect image data set. For example, once a current number of defect images that have been provided by the user is determined to be sufficient (e.g., as determined as corresponding to a top portion of the performance curve), an indication (e.g., a message, a displayed indictor, etc.) may be provided which indicates to the user that they do not need to provide more defect images for the training. As another example, if a current number of defect images that have been provided by the user is determined to be nearly sufficient (e.g., as determined to be approaching and/or nearly corresponding to a top portion of the performance curve), an indication (e.g., a message, a displayed indictor, etc.) may be provided which indicates such to the user (e.g., indicating that the user may need to only provide a few or otherwise a certain low number of additional defect images for the training and/or that the performance of the defect detection portion is considered/estimated to be nearly at the desired level, etc.) As another example, as described above with respect to FIG. 7, in some implementations certain analysis may be utilized to determine a recommended number of defect images for training (e.g., in accordance with corresponding to when an estimated top of the performance curve will occur, and/or as may also correspond to an approximate convergence with another curve or set of values, etc.) In accordance with such a determination, a user may in some instances be informed in advance as to a recommended number of defect images for the training (e.g., which in relation to a current number of defect images utilized for the training, may provide an indication as to whether or not additional defect images should continue to be provided for the training).

As noted above, for each unique image data set, various factors may influence the number of defect images needed for training. One such factor may be in regard to how visually differentiated the defects are from the backgrounds in the images. For example, in relation to the example images of FIGS. 3-5, it can be seen that the scratch defects 402 and 502 may in some instances be somewhat difficult to visually differentiate from the background of machining marks (e.g., as formed on the plate surfaces which appear as a hashed texture). In regard to such an example image data set as may include the images of FIGS. 3-5, in general more defect images may be required for the training to obtain a certain level of accuracy than would be required for an image data set including images in which the defects were more visually differentiated from the background (e.g., assuming other factors were approximately equal, etc.) Conversely, in general less defect images may be required for the training to obtain a certain level of accuracy than would be required for an image data set including images in which the defects were less visually differentiated from the background (e.g., assuming other factors were approximately equal, etc.)

Another factor may be in regard to how much the defects vary in visual characteristics. For example, it can be seen that the scratch defects 402A1, 402A2, 402B1, 402B2, 402C1, 402C2, 402D, 402E1, 402E2, 502B, 502C and 502D of the FIGS. 4A-4E and 5B-5D each have some amount of variance in certain visual characteristics (e.g., shapes, dimensions, etc.) In regard to such an example image data set as may include such defect images, in general more defect images may be required for the training to obtain a certain level of accuracy than would be required for an image data set including defect images in which the defects had less variance in visual characteristics (e.g., assuming other factors were approximately equal, etc.) As a specific example, in an image data set where all of the defect images included a nearly identical scratch defect (e.g., similar or identical to the scratch defect 502D), then less defect images may be required for the training to obtain a certain level of accuracy than would be required for an image data set including images in which the defects had more variance in visual characteristics, such as illustrated by the images of FIGS. 4A-4E and 5B-5D (e.g., assuming other factors were approximately equal, etc.)

Another factor may be in regard to how much the image background varies in visual characteristics. For example, it can be seen that the image backgrounds in FIGS. 3A-3F and 4A-4E each have some amount of variance in certain visual characteristics (e.g., in accordance with a variety of different types of machining marks formed on the plate surfaces which appear as a hashed texture that normally varies across the surface of the plates). In regard to such an example image data set as may include the images of FIGS. 3A-3F and 4A-4E, in general more defect images may be required for the training to obtain a certain level of accuracy than would be required for an image data set including images in which the backgrounds had less variance in visual characteristics (e.g., assuming other factors were approximately equal, etc.) As a specific example, in the images of FIGS. 5A-5D, the backgrounds are more similar (i.e., the types of machining marks formed on the surfaces of the portions of the plates are similar or nominally the same in each image and the primary difference between the images is the characteristics of the respective scratch defects 502B, 502C and 502D). In regard to such an example image data set as may include the images of FIGS. 5A-5D (and for which other images of the set may include similar backgrounds), in general less defect images may be required for the training to obtain a certain level of accuracy than would be required for an image data set including images in which the backgrounds had more variance in visual characteristics, such as illustrated by the images of FIGS. 3A-3F and 4A-4E (e.g., assuming other factors were approximately equal, etc.)

Another factor may be in regard to the image quality (e.g., as to whether the image quality is consistent and good in regard to focus, lighting, etc. and/or if it may vary for the different images in the image data set). For example, it can be seen that the images in FIGS. 3A-3F, 4A-4E and 5A-5D each appear to have relatively good focus, etc. In regard to such an example image data set as may include such images, in general less defect images may be required for the training to obtain a certain level of accuracy than would be required for an image data set including images in which the images had less image quality (e.g., assuming other factors were approximately equal, etc.) As a specific example, in an image data set with similar images except where all of the images had less focus (e.g., for which it may correspondingly be more difficult to accurately determine the characteristics of the scratch defects, backgrounds etc. and/or to differentiate the scratch defects from the backgrounds, etc.), in general more defect images may be required for the training to obtain a certain level of accuracy (e.g., assuming other factors were approximately equal, etc.)

In regard to such factors, as noted above for each unique image defect/background data set it may be desirable to determine the performance (e.g., to characterize the prediction accuracy of the utilized model) of the defect detection portion (e.g., as a function of the number of defect images provided for the training). In accordance with principles disclosed herein, by determining such performance, an indication may be provided (e.g., relative to a current number of defect images that have been utilized for the training) as to whether additional defect images should continue to be provided for the training in order to achieve a certain accuracy (e.g., an accuracy at which providing additional defect images for training is not expected to produce significant additional improvement).

Figure 14:
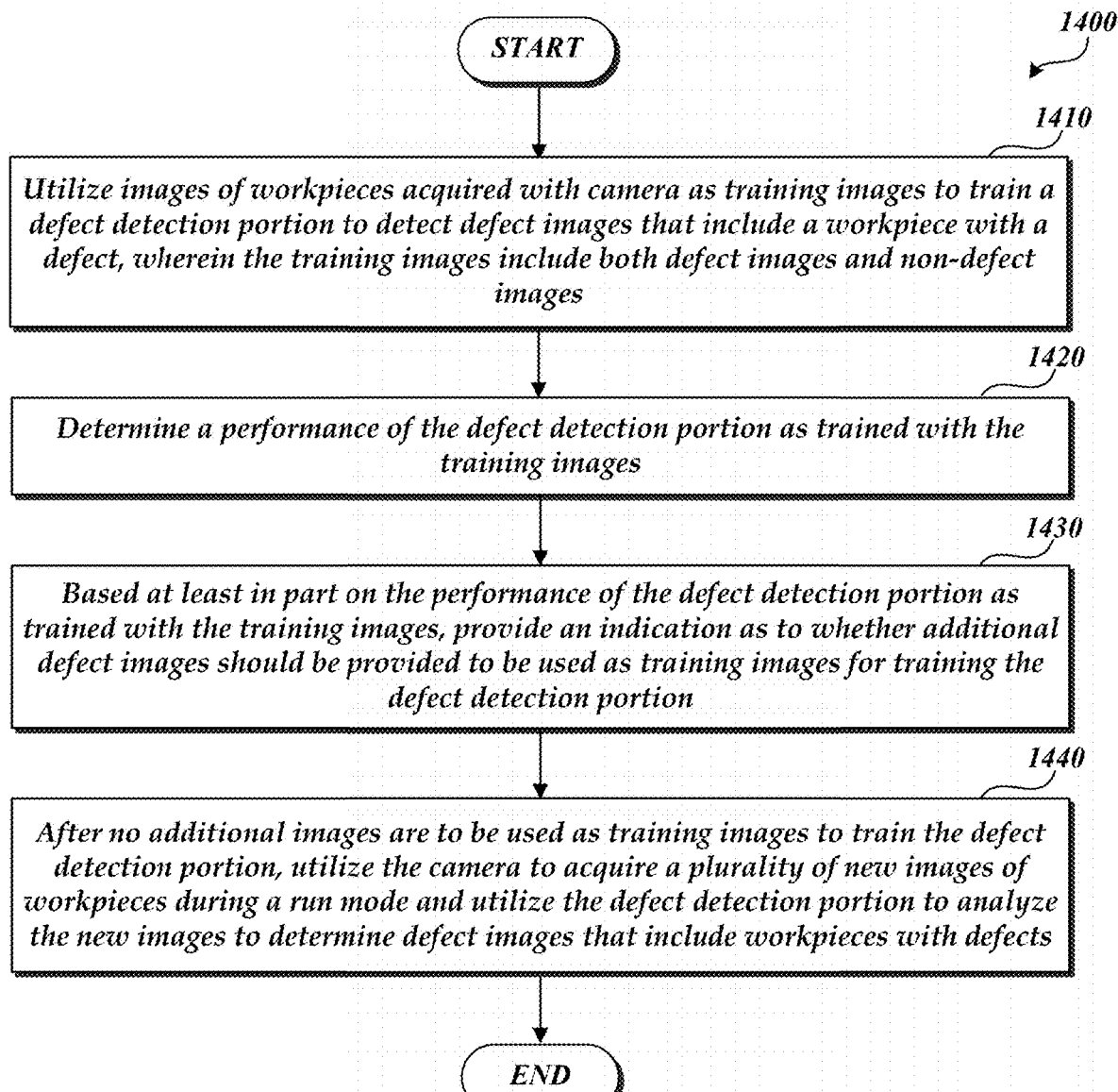
FIG. 14 shows a flow diagram of a method for operating a machine vision inspection system similar to that of FIG. 1.

FIG. 14 shows a flow diagram of a method 1400 for operating a machine vision inspection system similar to that of FIG. 1. At 1410, images of workpieces acquired with a camera of a workpiece inspection and defect detection system are utilized as training images to train a defect detection portion to detect defect images that include a workpiece with a defect. In various implementations, the training images include both defect images and non-defect images. At 1420, a performance of the defect detection portion as trained with the training images is determined. For example, in relation to the processes described above with respect to FIG. 13, all or part of a performance curve 1304 and/or related performance metrics may be determined for the defect detection portion. As another example, in relation to the processes described above with respect to FIG. 7, all or part of performance curves 702 and/or 704 and/or related performance metrics may be determined. As noted above, in some implementations the performance curves 702 and 704 may correspond to a training image set and a testing image set, respectively. In various implementations, some images (and/or corresponding sets and/or data) may also sometimes be referenced as "validation" images (and/or corresponding sets and/or data). As used herein, such images, sets and/or data are considered to be a particular type of "testing" images, sets and/or data.

At 1430, based at least in part on the performance of the defect detection portion as trained with the training images, an indication is provided as to whether additional defect images should be provided to be used as training images for training the defect detection portion. For example, in relation to the processes described above with respect to FIG. 13, a determination may be made as to whether additional defect images should be provided (e.g., as based on a slope of a performance curve 1304 and/or related performance metrics). In relation to such a determination, an indication may be provided (e.g., a message may be generated that indicates whether additional defect images should be provided, etc.) As another example, in relation to the processes described above with respect to FIG. 7, a determination may be made as to whether additional defect images should be provided (e.g., as based on utilizing an algorithm or other techniques to find a value of a number of defect images used to train the defect detection portion for which the performance curves 702 and 704 converge toward each other and/or as based on a slope of the performance curve 704 (e.g., as approaching zero) and/or as based on other related performance metrics). In relation to such a determination, an indication may be provided (e.g., a recommended number of defect images for training the defect detection portion may be indicated, which in relation to a current number of defect images that have been used may correspondingly indicate whether additional defect images should be provided). At 1440, after no additional images are to be used as training images to train the defect detection portion (e.g., if a message has been provided indicating that no additional defect images are required and/or if a recommended number of defect images that has been indicated has already been used for the training, etc.), the camera of the system may be utilized to acquire a plurality of new images of workpieces during a run mode and the defect detection portion may be utilized to analyze the new images to determine defect images that include workpieces with defects. Other operations may also be performed (e.g., metrology operations as described above with respect to FIGS. 6 and 12, etc.)

Figure 15:
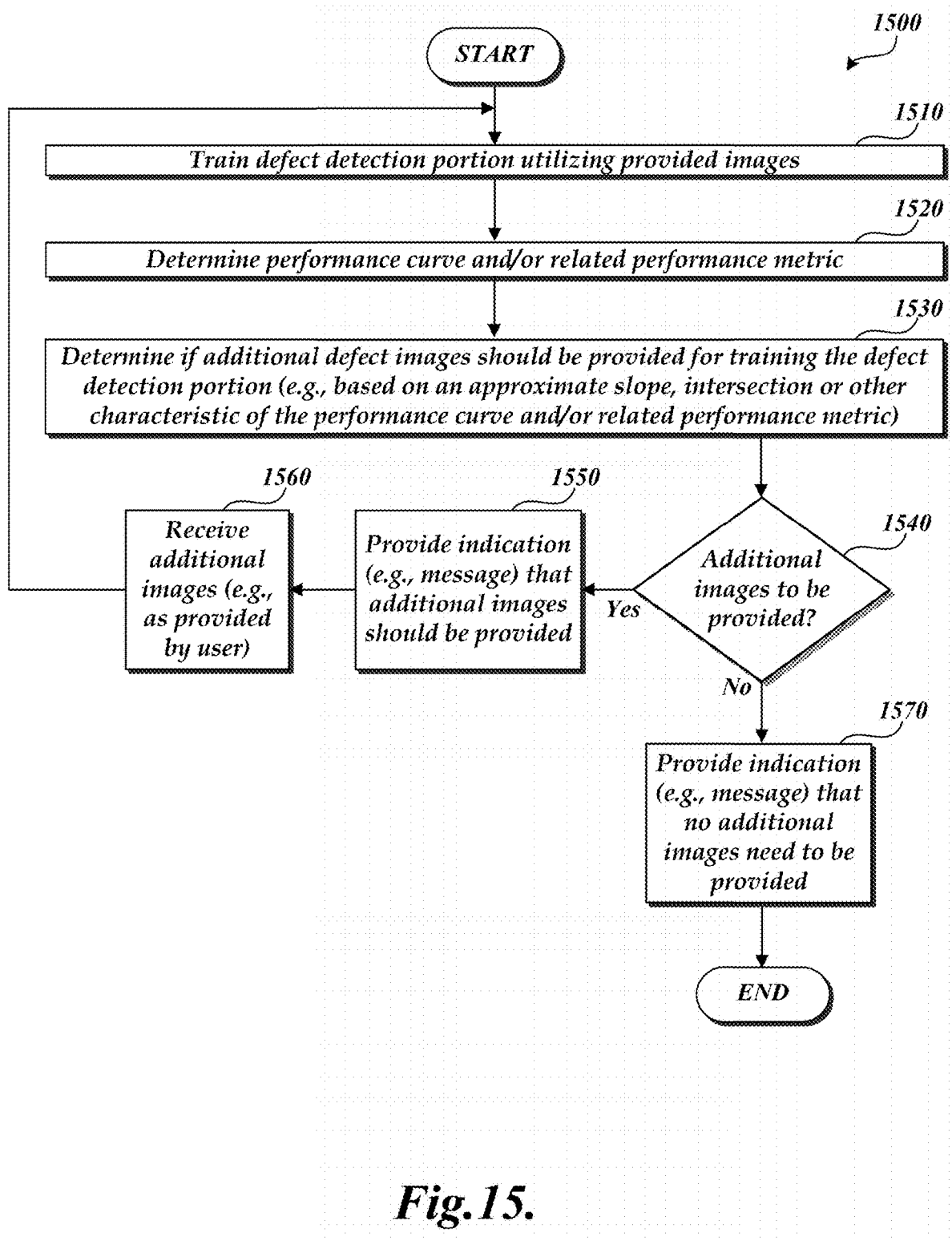
FIG. 15 shows a flow diagram of a method for operating a machine vision inspection system similar to that of FIG. 1.

FIG. 15 shows a flow diagram of a method 1500 for operating a machine vision inspection system similar to that of FIG. 1. In various implementations, the method 1500 may be representative of a more specific and/or more detailed example implementation of certain operations of 1410-1430 of FIG. 14, as will be described in more detail below. At 1510, a defect detection portion is trained utilizing images that have been provided (e.g., including defect images for which the defects and/or defect pixels corresponding to the defects have been marked by a user). At 1520, a performance curve and/or related performance metric is determined (e.g., as described above with respect to performance curve 1304 of FIG. 13, or the performance curve 704 of FIG. 7, etc.) At 1530, a determination is made if additional defect images should be provided for training the defect detection portion (e.g., based on an approximate slope, intersection or other characteristic(s) of the performance curve and/or related performance metric(s), such as described above with respect to FIGS. 7 and 13). At 1540, if additional images are to be provided, the method 1500 proceeds to 1550, where an indication (e.g., a message) is provided indicating that additional images should be provided for training the defect detection portion. At 1560, additional images are received (e.g., as provided by a user, etc.) From 1560, the method 1500 returns to 1510 (e.g., where the additional images are utilized for further training). If at 1540 no additional images are to be provided, the method 1500 proceeds to 1570, where an indication (e.g., message) is provided indicating that no additional images are needed/recommended, etc. for training the defect detection portion. The method 1500 then ends.

As illustrated by the sequence of operations of 1510-1560, in various implementations the training process may proceed through multiple iterations. In accordance with such iterations, after a user has provided a new set of defect images for training, in various implementations the user may continue to be informed whether the current amount of defect images has been sufficient for achieving a desired level of performance of the defect detection portion, or if additional defect images should continue to be provided. By keeping the user informed, time and resources can be saved by not having the user continue to provide defect images after additional images will no longer significantly improve the performance of the defect detection portion. It will be appreciated that without the utilization of processes such as those disclosed herein, the user may not know if providing additional defect images is likely to improve performance without taking time to collect and mark the defect images (e.g., mark the defect pixels or otherwise mark the defects) and further train the defect detection portion to assess the performance. As noted above, for some number of images that is unique to each image defect/background data set, the performance improvements that can be expected from providing additional defect images for the training may be nominally negligible. Accordingly, it may be desirable to provide data set specific guidance for when a sufficient number of defect images has been provided for achieving desired performance results (e.g., which may correspond to a portion of a performance curve that is approaching a zero slope and/or is otherwise relatively flat, etc.)

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A workpiece inspection and defect detection system, comprising:
   a light source;
   a lens that inputs image light arising from a surface of a workpiece which is illuminated by the light source, and transmits the image light along an imaging optical path;
   a camera that receives imaging light transmitted along the imaging optical path and provides an image of the workpiece;
   one or more processors; and
   a memory coupled to the one or more processors and storing program instructions that when executed by the one or more processors cause the one or more processors to at least:
      utilize images of workpieces acquired with the camera as training images to train a defect detection portion to detect defect images that include a workpiece with a defect, wherein the training images include both defect images and non-defect images;
      determine an accuracy performance of the defect detection portion as trained with the training images;
      based at least in part on the accuracy performance of the defect detection portion as trained with the training images, provide an indication as to whether additional defect images should be provided to be used as training images for training the defect detection portion; and
      after no additional images are to be used as training images to train the defect detection portion, utilize the camera to acquire a plurality of new images of workpieces during a run mode and utilize the defect detection portion to analyze the new images to determine defect images that include workpieces with defects.

2. The system of claim 1, wherein the indication that is provided comprises a message that indicates that additional defect images should be provided and the defect detection portion is trained with additional defect images that are correspondingly provided, and the program instructions when executed by the one or more processors further cause the one or more processors to:
   determine an accuracy performance of the defect detection portion as trained with the additional defect images; and
   based at least in part on the accuracy performance of the defect detection portion as trained with the additional defect images, provide an indication as to whether additional defect images should be provided to be used as training images for training the defect detection portion.

3. The system of claim 2, wherein the performance of the defect detection portion as trained with the additional defect images corresponds to a portion of an accuracy performance curve that has a lower slope than a portion of the performance curve that corresponds to the performance of the defect detection portion before the additional defect images were used to train the defect detection portion.

4. The system of claim 3, wherein when no additional images are to be used to train the defect detection portion, the slope of the portion of the accuracy performance curve that corresponds to the performance of the defect detection portion as trained by the current number of defect images is approximately flat relative to earlier portions of the performance curve.

5. The system of claim 1, wherein the determination of the accuracy performance of the defect detection portion is based at least in part on a determination of a number of defect pixels or defect images that are accurately classified by the defect detection portion as defect pixels or defect images.

6. The system of claim 1, wherein the determination of the accuracy performance of the defect detection portion is based at least in part on a determination of a number of non-defect pixels or non-defect images that are accurately classified by the defect detection portion as non-defect pixels or non-defect images.

7. The system of claim 1, wherein the program instructions when executed by the one or more processors further cause the one or more processors to:
   perform one or more metrology operations using one or more of the new images of workpieces acquired during the run mode.

8. The system of claim 1, wherein the training images comprise a first plurality of training images and a second plurality of training images, and the determining of the accuracy performance of the defect detection portion comprises:
   utilizing a first plurality of testing or validation images of workpieces acquired with the camera, and that are not included in the first plurality of training images, to test the defect detection portion as trained using the first plurality of training images, wherein a first accuracy performance metric is determined from the test;
   utilizing a second plurality of testing or validation images acquired with the camera, and that are not included in the first or second plurality of training images, to test the defect detection portion as trained using the first and second plurality of training images, wherein a second accuracy performance metric is determined from the test; and
   based at least in part on the first and second performance metrics, determining a recommended number of defect images for training the defect detection portion.

9. The system of claim 8, wherein the providing of the indication comprises generating a message that includes the recommended number of defect images for training, and for which the recommended number of defect images correspondingly indicates whether additional defect images should be provided in relation to a current number of defect images that have been utilized for the training.

10. A method performed by a workpiece inspection and defect detection system including at least a light source, a lens, a camera and a defect detection portion, the method comprising:
   utilizing images of workpieces acquired with the camera as training images to train a defect detection portion to detect defect images that include a workpiece with a defect, wherein the training images include both defect images and non-defect images;
   determining an accuracy performance of the defect detection portion as trained with the training images;
   based at least in part on the accuracy performance of the defect detection portion as trained with the training images, providing an indication as to whether additional defect images should be provided to be used as training images for training the defect detection portion; and after no additional images are to be used as training images to train the defect detection portion, utilizing the camera to acquire a plurality of new images of workpieces during a run mode and utilizing the defect detection portion to analyze the new images to determine defect images that include workpieces with defects.

11. The method of claim 10, wherein the indication that is provided comprises a message that indicates that additional defect images should be provided and the defect detection portion is trained with additional defect images that are correspondingly provided, and the method further comprises:

determining an accuracy performance of the defect detection portion as trained with the additional defect images; and based at least in part on the accuracy performance of the defect detection portion as trained with the additional defect images, providing an indication as to whether additional defect images should be provided to be used as training images for training the defect detection portion.

12. The method of claim 11, wherein the performance of the defect detection portion as trained with the additional defect images corresponds to a portion of a performance curve that has a lower slope than a portion of the performance curve that corresponds to the performance of the defect detection portion before the additional defect images were used to train the defect detection portion.

13. The method of claim 12, wherein when no additional images are to be used to train the defect detection portion, the slope of the portion of the performance curve that corresponds to the performance of the defect detection portion as trained by the current number of defect images is less than 5% of a maximum slope of the performance curve.

14. The method of claim 10, wherein the determination of the performance of the defect detection portion is based at least in part on at least one of:

a determination of a number of defect pixels or defect images that are accurately classified by the defect detection portion as defect pixels or defect images; or a determination of a number of non-defect pixels or non-defect images that are accurately classified by the defect detection portion as non-defect pixels or non-defect images.

15. The method of claim 10, further comprising:
performing one or more metrology operations using one or more of the new images of workpieces acquired during the run mode.

16. The method of claim 10, wherein the training images comprise a first plurality of training images and a second plurality of training images, and the determining of the performance of the defect detection portion comprises:

utilizing a first plurality of testing or validation images of workpieces acquired with the camera, and that are not included in the first plurality of training images, to test the defect detection portion as trained using the first plurality of training images, wherein a first accuracy performance metric is determined from the test;

utilizing a second plurality of testing or validation images acquired with the camera, and that are not included in the first or second plurality of training images, to test the defect detection portion as trained using the first and second plurality of training images, wherein a second accuracy performance metric is determined from the test; and based at least in part on the first and second performance metrics, determining a recommended number of defect images for training the defect detection portion, wherein the providing of the indication comprises generating a message that indicates the recommended number of defect images for training, and for which the recommended number of defect images correspondingly indicates whether additional defect images should be provided in relation to a current number of defect images that have been utilized for the training.

17. A non-transitory computer-readable medium storing program instructions that when executed by one or more processors cause the one or more processors to at least:

utilize images of workpieces acquired with a camera of a workpiece inspection and defect detection system as training images to train a defect detection portion to detect defect images that include a workpiece with a defect, wherein the training images include both defect images and non-defect images;

determine an accuracy performance of the defect detection portion as trained with the training images;

based at least in part on the accuracy performance of the defect detection portion as trained with the training images, provide an indication as to whether additional defect images should be provided to be used as training images for training the defect detection portion; and after no additional images are to be used as training images to train the defect detection portion, utilize the camera to acquire a plurality of new images of workpieces during a run mode and utilize the defect detection portion to analyze the new images to determine defect images that include workpieces with defects.

18. The non-transitory computer-readable medium of claim 17, wherein the indication that is provided comprises a message that indicates that additional defect images should be provided and the defect detection portion is trained with additional defect images that are correspondingly provided, and the program instructions when executed by the one or more processors further cause the one or more processors to:

determine an accuracy performance of the defect detection portion as trained with the additional defect images; and based at least in part on the accuracy performance of the defect detection portion as trained with the additional defect images, provide an indication as to whether additional defect images should be provided to be used as training images for training the defect detection portion.

19. The non-transitory computer-readable medium of claim 18, wherein the performance of the defect detection portion as trained with the additional defect images corresponds to a portion of a performance curve that has a lower slope than a portion of the performance curve that corresponds to the performance of the defect detection portion before the additional defect images were used to train the defect detection portion.

20. The non-transitory computer-readable medium of claim 19, wherein when no additional images are to be used to train the defect detection portion, the slope of the portion of the performance curve that corresponds to the performance of the defect detection portion as trained by the current number of defect images is approximately flat relative to earlier portions of the performance curve.

21. The non-transitory computer-readable medium of claim 17, wherein the determination of the performance of the defect detection portion is based at least in part on at least one of:
- a determination of a number of defect pixels or defect images that are accurately classified by the defect detection portion as defect pixels or defect images; or
- a determination of a number of non-defect pixels or non-defect images that are accurately classified by the defect detection portion as non-defect pixels or non-defect images.

22. The non-transitory computer-readable medium of claim 17, wherein the program instructions when executed by the one or more processors further cause the one or more processors to:
perform one or more metrology operations using one or more of the new images of workpieces acquired during the run mode.

23. The non-transitory computer-readable medium of claim 17, wherein the training images comprise a first plurality of training images and a second plurality of training images, and the determining of the accuracy performance of the defect detection portion comprises:
utilizing a first plurality of testing or validation images of workpieces acquired with the camera, and that are not included in the first plurality of training images, to test the defect detection portion as trained using the first plurality of training images, wherein a first performance metric is determined from the test;
utilizing a second plurality of testing or validation images acquired with the camera, and that are not included in the first or second plurality of training images, to test the defect detection portion as trained using the first and second plurality of training images, wherein a second accuracy performance metric is determined from the test; and
based at least in part on the first and second performance metrics, determining a recommended number of defect images for training the defect detection portion, wherein the providing of the indication comprises generating a message that indicates the recommended number of defect images for training, and for which the recommended number of defect images correspondingly indicates whether additional defect images should be provided in relation to a current number of defect images that have been utilized for the training.

24. The non-transitory computer-readable medium of claim 17, wherein the program instructions when executed by the one or more processors further cause the one or more processors to:
utilize augmented data to train the defect detection portion;
based at least in part on an accuracy performance of the defect detection portion as trained with and without the augmented data, determine at least one of:
whether additional defect images should be provided to be used as training images for training the defect detection portion; or
a recommended number of defect images for training the defect detection portion.

* * * * *